US011361082B2

(12) United States Patent
Obee et al.

(10) Patent No.: US 11,361,082 B2
(45) Date of Patent: Jun. 14, 2022

(54) ANOMALOUS ACTIVITY DETECTION IN MULTI-PROVIDER TRANSACTIONAL ENVIRONMENTS

(71) Applicant: Optum Services (Ireland) Limited, Dublin (IE)

(72) Inventors: Elizabeth Obee, New Orleans, LA (US); Sheila Greene, Dublin (IE); Jacques Bellec, Dublin (IE); Tristan Spoor, Stow, MA (US)

(73) Assignee: Optum Services (Ireland) Limited, Dublin (IE)

( * ) Notice: Subject to any disclaimer, the term of this patent is extended or adjusted under 35 U.S.C. 154(b) by 589 days.

(21) Appl. No.: 16/286,918

(22) Filed: Feb. 27, 2019

(65) Prior Publication Data
US 2020/0272740 A1 Aug. 27, 2020

(51) Int. Cl.
*G06F 21/57* (2013.01)
*G06Q 30/00* (2012.01)

(52) U.S. Cl.
CPC ....... *G06F 21/577* (2013.01); *G06Q 30/0185* (2013.01); *G06F 2221/034* (2013.01)

(58) Field of Classification Search
CPC .......................... G06F 21/577; G06Q 30/0185
See application file for complete search history.

(56) References Cited

U.S. PATENT DOCUMENTS

| | | | |
|---|---|---|---|
| 6,915,254 B1 | 7/2005 | Heinze et al. | |
| 7,917,525 B2 | 3/2011 | Rawlings et al. | |
| 9,648,036 B2 * | 5/2017 | Seiver | H04L 29/06585 |
| 9,779,147 B1 | 10/2017 | Sherman et al. | |
| 9,792,658 B1 | 10/2017 | Vijendra et al. | |
| 2001/0020229 A1 | 9/2001 | Lash | |
| 2002/0073138 A1 | 6/2002 | Gilbert et al. | |
| 2002/0128861 A1 | 9/2002 | Lau et al. | |
| 2003/0060688 A1 | 3/2003 | Ciarniello et al. | |
| 2004/0064341 A1 | 4/2004 | Langan et al. | |
| 2004/0243438 A1 | 12/2004 | Mintz | |
| 2005/0228808 A1 | 10/2005 | Mamou et al. | |
| 2007/0061393 A1 | 3/2007 | Moore | |
| 2008/0103798 A1 * | 5/2008 | Domenikos | G06Q 30/0185 |
| | | | 705/318 |

(Continued)

FOREIGN PATENT DOCUMENTS

WO 2016/029272 A1 3/2016

OTHER PUBLICATIONS

Viehmann et al., "A Shortest Path to Using Graph Technologies," Oracle, Jan. 31, 2017, pp. 1-34.

(Continued)

*Primary Examiner* — Oleg Korsak
(74) *Attorney, Agent, or Firm* — Alston & Bird LLP

(57) ABSTRACT

To detect anomalous activity within a multi-provider environment of transactional data, a particular target entity of a plurality of entities, such as a provider, is identified; multiple relationships associated with the multi-provider environment are determined, wherein each relationship is associated with a relationship score, and wherein the relationship score is determined based on a relational proximity criterion satisfied by the relationship; one or more risk scores are generated; a network risk score is generated for the target entity, multiple levels of related entities are identified, and anomalous activity detection is performed based on the network risk score. Anomalous activity and entity relationships are presented in a graph interface.

20 Claims, 12 Drawing Sheets

(56) References Cited

U.S. PATENT DOCUMENTS

| | | | |
|---|---|---|---|
| 2008/0103799 A1* | 5/2008 | Domenikos | G06Q 30/0185 705/318 |
| 2008/0103800 A1* | 5/2008 | Domenikos | G06Q 30/0185 705/318 |
| 2008/0162182 A1 | 7/2008 | Cazares et al. | |
| 2009/0089092 A1 | 4/2009 | Johnson et al. | |
| 2011/0077958 A1 | 3/2011 | Breitenstein et al. | |
| 2011/0077972 A1 | 3/2011 | Breitenstein et al. | |
| 2011/0077973 A1 | 3/2011 | Breitenstein et al. | |
| 2011/0246229 A1* | 10/2011 | Pacha | G06Q 10/10 705/2 |
| 2013/0006668 A1* | 1/2013 | Van Arkel | G06Q 10/10 705/3 |
| 2014/0081652 A1* | 3/2014 | Klindworth | G06Q 40/08 705/2 |
| 2014/0278479 A1* | 9/2014 | Wang | G06Q 10/10 705/2 |
| 2015/0026120 A1 | 1/2015 | Chrapko et al. | |
| 2016/0004979 A1 | 1/2016 | Getchius | |
| 2016/0099963 A1* | 4/2016 | Mahaffey | H04W 12/12 726/25 |
| 2017/0169174 A1* | 6/2017 | Yeung | G16H 50/70 |
| 2018/0096105 A1 | 4/2018 | Bleicher et al. | |
| 2018/0219888 A1* | 8/2018 | Apostolopoulos | H04L 63/1425 |
| 2019/0378051 A1* | 12/2019 | Widmann | G06Q 30/0185 |
| 2020/0013124 A1* | 1/2020 | Obee | G06N 20/00 |
| 2021/0089931 A1* | 3/2021 | Bellec | G16H 40/20 |
| 2021/0133605 A1* | 5/2021 | Greene | G06N 20/00 |

OTHER PUBLICATIONS

U.S. Patent and Trademark Office, NonFinal Office Action for U.S. Appl. No. 12/890,018, dated Jun. 1, 2012, 20 pages, USA.

Nguyen et al., "Managing and Visualizing Citation Network Using Graph Database and LDA Model," Proceedings of the Eighth International Symposium on Information and Communication Technology, Dec. 2017, Nha Trang City, Vietnam, pp. 100-105. DOI: 10.1145/3155133.3155154.

Luke et al., "Network Analysis in Public Health: History, Methods and Applications," Annual Review of Public Health, vol. 28, Apr. 21, 2007, pp. 69-93. DOI: 10.1146/annurev.publhealth.28.021406.144132.

Keating et al., "Factors Affecting Influential Discussions Among Physicians: A Social Network Analysis of a Primary Care Practice," Journal of General Internal Medicine, Jun. 2007, vol. 22, Issue 6, pp. 794-798. DOI: 10.1007/s11606-007-0190-8.

Fattore et al., "Social Network Analysis in Primary Care: The Impact of Interactions on Prescriving Behaviour," Health Policy, vol. 92, Issues 2-3, Oct. 2009, pp. 141-148. DOI: 10.1016/j.healthpol.2009.03.005.

De Ville, "Discover and Drive Brand Activity in Social Networks," Paper 109-2009, SAS Global Forum 2009, Data Mining and Predictive Modeling, SAS Instritute Inc., Cary, North Carolina, (2009), pp. 1-13.

Clancy, "Managing Organizational Complexity: Putting It Altogether—Improving Performance in Heart Failure Outcomes," The Journal of Nursing Administration, vol. 39, No. 6, Jun. 2009, pp. 249-254. DOI: 10.1097/NNA.0b013e3181a7909a.

"SAS Detection and Investigation for Insurance," YouTube, Mar. 9, 2018, [online], [retrieved from the Internet Jun. 4, 2019], <URL: https://www.youtube.com/watch?v=Tz1Shn8i1ro>, 14 pages.

"Performing an Advanced Search With SAS® Visual Investigator 10.3," [online], [retrieved from the Internet Jun. 5, 2019], <URL: https://video.sas.com/category/videos/sas-visual-investigator>, 11 pages.

"Healthcare Provider Fraud (IBM Case Manager, i2, Watson Content Analytics," YouTube, [online], [retrieved from the Internet Jun. 5, 2019], <URL: https://www.youtube.com/watch?v=FdXIZ95xF40>, 12 pages.

"Cardiologist, Neurologist, and Others Charged in $50 Million Health Care Fraud Scheme, and Civil Suit Filed Against Clinic and Participants in the Fraud," United States Department of Justice, Southern District of New York, (5 pages), Mar. 1, 2017, (article, online), [Retrieved from the Internet Oct. 13, 2021] <URL: https://www.justice.gov/usao-sdny/pr/cardiologist-neurologist-and-others-charged-50-million-health-care-fraud-scheme-and>.

"Palantir Health—Maximizing Data Assets to Improve Quality, Risk, and Compliance," (7 pages), Aug. 19, 2019, (online), [Retrieved from Wayback Machine Oct. 13, 2021] <URL: http://www.palantir.com/wp-assets/media/capabilities-perspectives/Palantir-Health.pdf>.

Lev-Ram, Michal. "Palantir Connects the Dots With Big Data," Fortune, (13 pages), Mar. 9, 2016, (online), [Retrieved from the Internet Oct. 13, 2021] <URL: https://fortune.com/longform/palantir-big-data-analysis/>.

\* cited by examiner

ANOMALOUS ACTIVITY DETECTION IN MULTI-PROVIDER TRANSACTIONAL ENVIRONMENTS

BACKGROUND

Detecting anomalous activities, such as fraudulent activities, in multi-provider transactional environments is a technical challenge related to the fields of computational pattern recognition and predictive data analysis. Multi-provider transactional environments complicate detection of anomalous activities because they can generate large amounts of transactional data that potentially point to numerous patterns of activities across different entities. Each particular provider generates numerous transactional patterns that may, depending on various contextual factors associated with the activities of related providers, point to anomalous activities or indicate legitimate activities for both particular providers and related providers. Because of the volume of transactional data, the multiplicity of provider actors, and the large number of inter-provider relationships, it is challenging to provide solutions that facilitate anomalous activity detection and entity relationship visualization. Thus, there is a continuing need for anomalous activity detection and risk scoring in multi-provider transactional environments.

BRIEF SUMMARY

In general, embodiments of the present invention provide methods, apparatus, systems, computing devices, computing entities, and/or the like for anomalous activity detection in multi-provider transactional environments. Certain embodiments utilize systems, methods, and computer program products that enable anomalous activity detection in multi-provider transactional environments using graph-based solutions.

In accordance with one aspect, a method is provided. In one embodiment, the method comprises: identifying a target provider node of a plurality of provider nodes; determining, based on transactional data associated with the multi-provider environment, multiple relationships associated with the multi-provider environment, wherein each relationship of the multiple relationships is associated with a first relationship score, and wherein the first relationship score for a relationship of the multiple relationship is determined based on a relational proximity criterion satisfied by the relationship; generating one or more risk scores, including a risk score for each relationship of the multiple relationships; determining a network risk score for the target provider node based on each first relationship score associated with a relationship of the multiple relationships and the one or more risk scores; and performing the anomalous activity detection based on the network risk score.

In certain embodiments, the multiple relationships comprise: one or more direct relationships each satisfying a direct relational proximity criterion and each involving the target provider node and a direct partner node of the plurality of provider nodes; and one or more indirect relationships each satisfying an indirect relational proximity criterion and each involving a first direct partner node associated with a first direct relationship of the one or more direct relationships and an indirect partner node of the plurality of provider nodes. Moreover, the multiple relationships may further comprise: one or more independent relationships each satisfying an independent relational proximity criterion and each involving a first indirect partner node associated with a first indirect relationship of the one or more indirect relationships and a second indirect partner node associated with a second indirect relationship of the one or more indirect relationships.

In certain embodiments, the data comprises a provider data item for each provider of a plurality of providers and a relationship data item defining a relationship of the multiple relationships. Moreover, the method may further comprise determining the transaction data. In various embodiments, determining the transaction data may comprise: processing one or more transaction records to create multiple a plurality of provider-consumer relationships; determining one or more providers of interest based on the plurality of provider-consumer relationships; processing the plurality of provider-consumer relationships to generate a plurality of member-based provider relationships; and processing the plurality of member-based provider relationships to generate a plurality of aggregate provider relationships.

In various embodiments, each provider data item is determined based on the plurality of provider-consumer relationships. In certain embodiments, each relationship data item is generated based on the plurality of aggregate provider relationships.

Various embodiments are directed to a method for generating a graph interface for anomalous activity detection in a multi-provider environment. In certain embodiments, the computer-implemented method comprises: maintaining, in a relational database, transactional data for the multi-provider environment, wherein the transaction data comprises a provider data item for each provider of a plurality of providers of the multi-provider environment and a relationship data item defining a relationship of multiple relationships associated with the multi-provider environment; constructing, within a relational database, a plurality of provider-centric transmutations of the data for each of the plurality of providers, wherein each provider-centric transmutation is generated for a corresponding master provider node of the plurality of providers, and wherein each provider-centric transmutation comprises a subset of the data identified as satisfying a particular relational criterion relative to the corresponding master provider for the provider-centric transmutation; and generating a graph interface view for a provider-centric transmutation of the plurality of provider-centric transmutations, wherein the graph interface view graphically depicts relationships between the master provider and additional entity level representations of provider attributes identified within the subset of transaction data identified for the provider-centric transmutation.

In certain embodiments, the multiple relationships comprise: one or more direct relationships each satisfying a direct relational proximity criterion and each involving the target provider node and a direct partner node of the plurality of provider nodes; and one or more indirect relationships each satisfying an indirect relational proximity criterion and each involving a direct partner node associated with a direct relationship of the one or more direct relationships and an indirect partner node of the plurality of provider nodes. In various embodiments, the multiple relationships further comprise: one or more independent relationships each satisfying an independent relational proximity criterion and each involving a indirect partner node associated with a indirect relationship of the one or more indirect relationships. Moreover, maintaining the transactional data item may comprise: processing one or more transaction records to create multiple a plurality of provider-consumer relationships; determining one or more providers of interest based on the plurality of provider-consumer relationships; processing the plurality of provider-consumer relationships to generate a plurality of member-based provider relationships; and processing the plurality of member-based provider relationships to generate a plurality of aggregate provider relationships. In certain embodiments, each provider data item is determined based on the plurality of provider-consumer relationships. In various embodiments, each relationship data item is generated based on the plurality of aggregate provider relationships.

Certain embodiments are directed to a computing apparatus, the apparatus comprising at least one processor and at least one memory including program code, the at least one memory and the program code configured to, with the processor, cause the apparatus to at least: identify a target provider node of a plurality of provider nodes; determine, based on transactional data associated with the multi-provider environment, multiple relationships associated with the multi-provider environment, wherein each relationship of the multiple relationships is associated with a relationship score, and wherein the relationship score for a relationship of the multiple relationship is determined based on a relational proximity criterion satisfied by the relationship; generate one or more risk scores, including a risk score for each relationship of the multiple relationships; determine a network risk score for the target provider node based on each relationship score associated with a relationship of the multiple relationships and the one or more risk scores; and perform the anomalous activity detection based on the network risk score.

In certain embodiments, the multiple relationships comprise: one or more direct relationships each satisfying a direct relational proximity criterion and each involving the target entity node and a direct entity node of the plurality of nodes; and one or more indirect relationships each satisfying an indirect relational proximity criterion and each involving a direct partner node associated with the target node as well as an additional entity node. Moreover, the multiple relationships may further comprise one or more independent relationships each satisfying an independent relational proximity criterion and each involving an indirect partner node associated with a indirect relationship of the one or more indirect relationships and a second indirect partner node.

In certain embodiments, the transactional data may be transmutated to derive a provider data item for each provider of a plurality of providers and a relationship data item defining a relationship of the multiple relationships. Moreover, the at least one memory and the program code may be further configured to, with the processor, further cause the apparatus to: determine the transactional data.

Certain embodiments are directed to a non-transitory computer-readable storage medium for generating a graph interface for anomalous activity detection in a multi-provider environment, the computer-readable storage medium storing program code instructions that, when executed, cause a computing device to: identify a target entity of a plurality of entities; determine, based on transactional data associated with the multi-provider environment, multiple relationships associated with the multi-provider environment, wherein each relationship of the multiple relationships is associated with a relationship score, and wherein the relationship score for a relationship of the multiple relationship is determined based on a relational proximity criterion satisfied by the relationship; generate one or more risk scores, including a risk score for each relationship of the multiple relationships; determine a network risk score for the target entity based on each relationship score associated with a relationship of the multiple relationships and the one or more risk scores; and perform the anomalous activity detection based on the network risk score.

BRIEF DESCRIPTION OF THE SEVERAL VIEWS OF THE DRAWINGS

Figure 1:
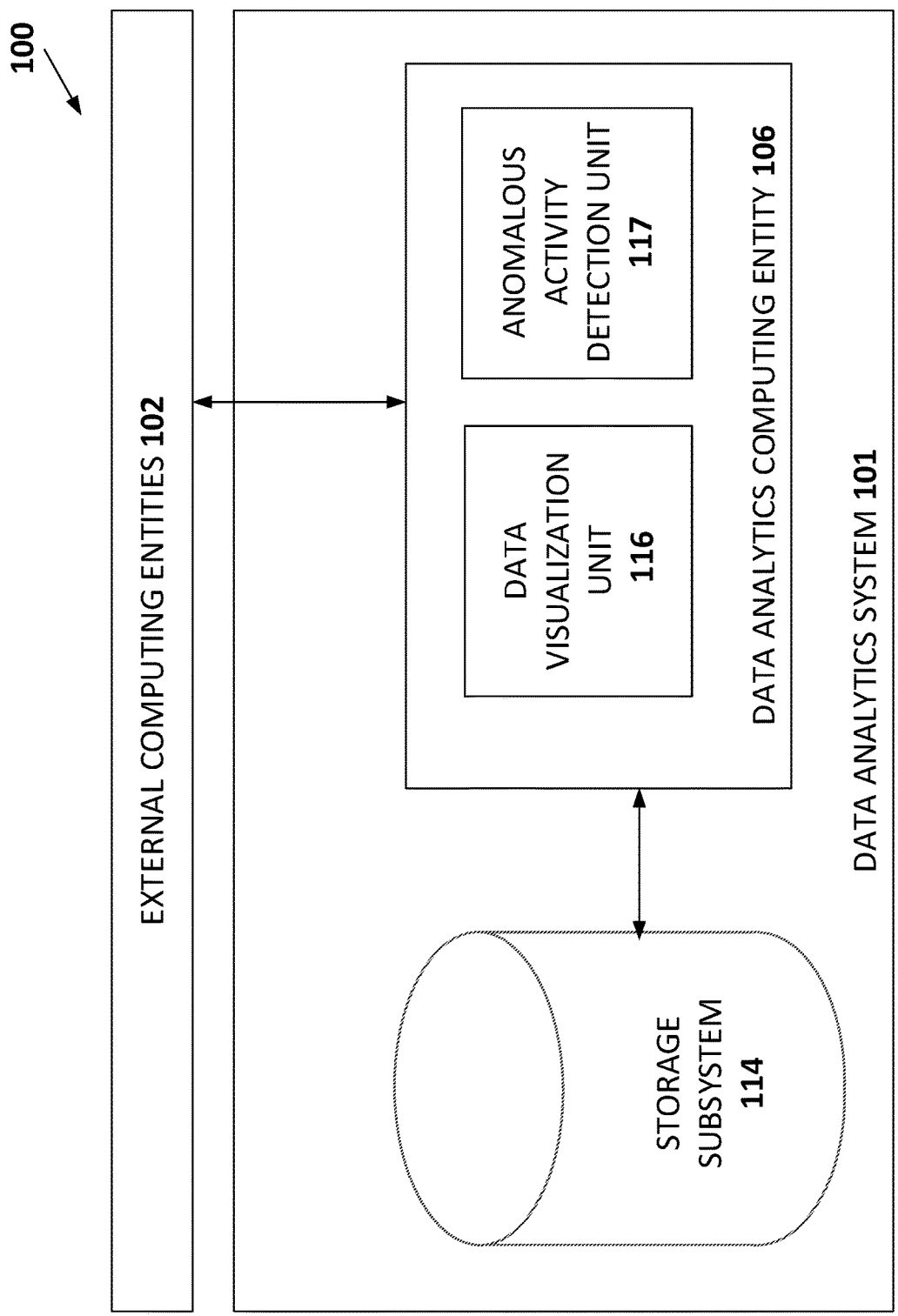

Having thus described the invention in general terms, reference will now be made to the accompanying drawings, which are not necessarily drawn to scale, and wherein:

FIG. 1 is an exemplary overview of an architecture that can be used to practice embodiments of the present invention.

Figure 2:
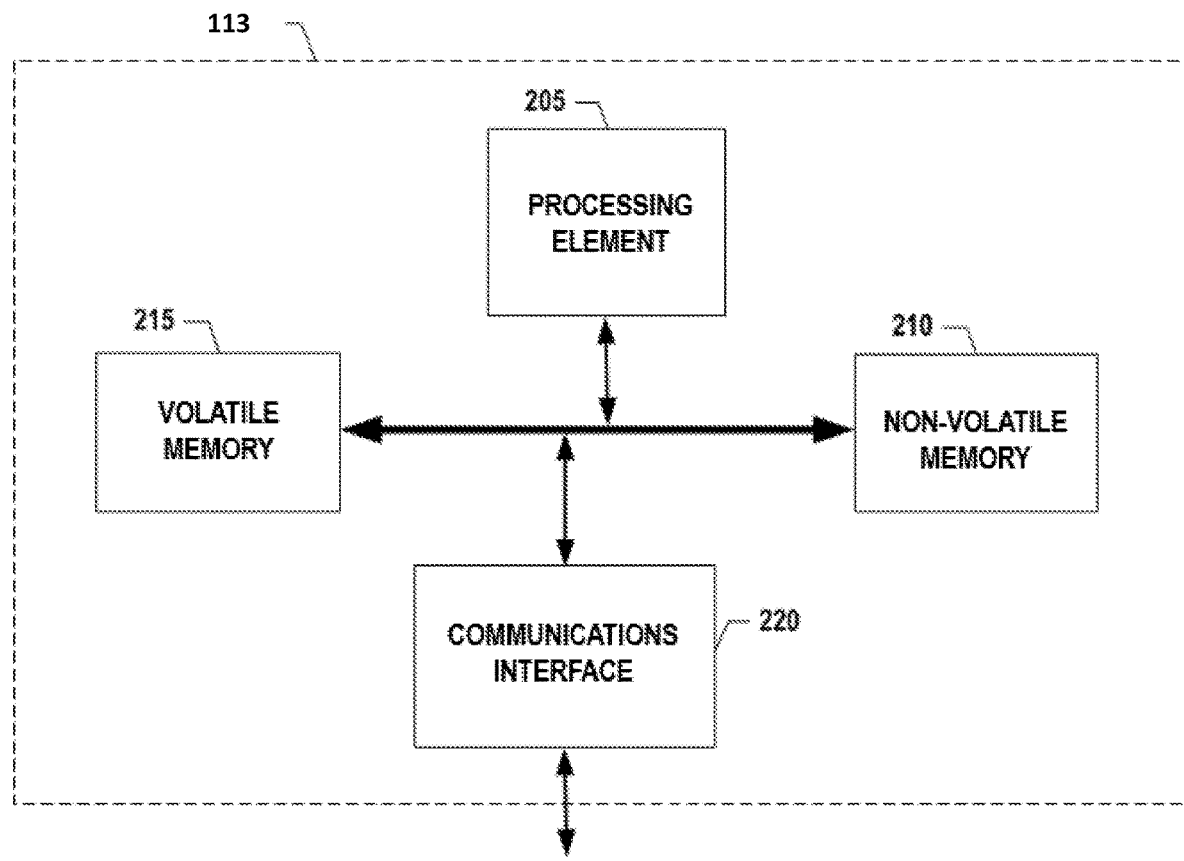

FIG. 2 illustrates an example data analytics computing entity in accordance with some embodiments discussed herein.

Figure 3:
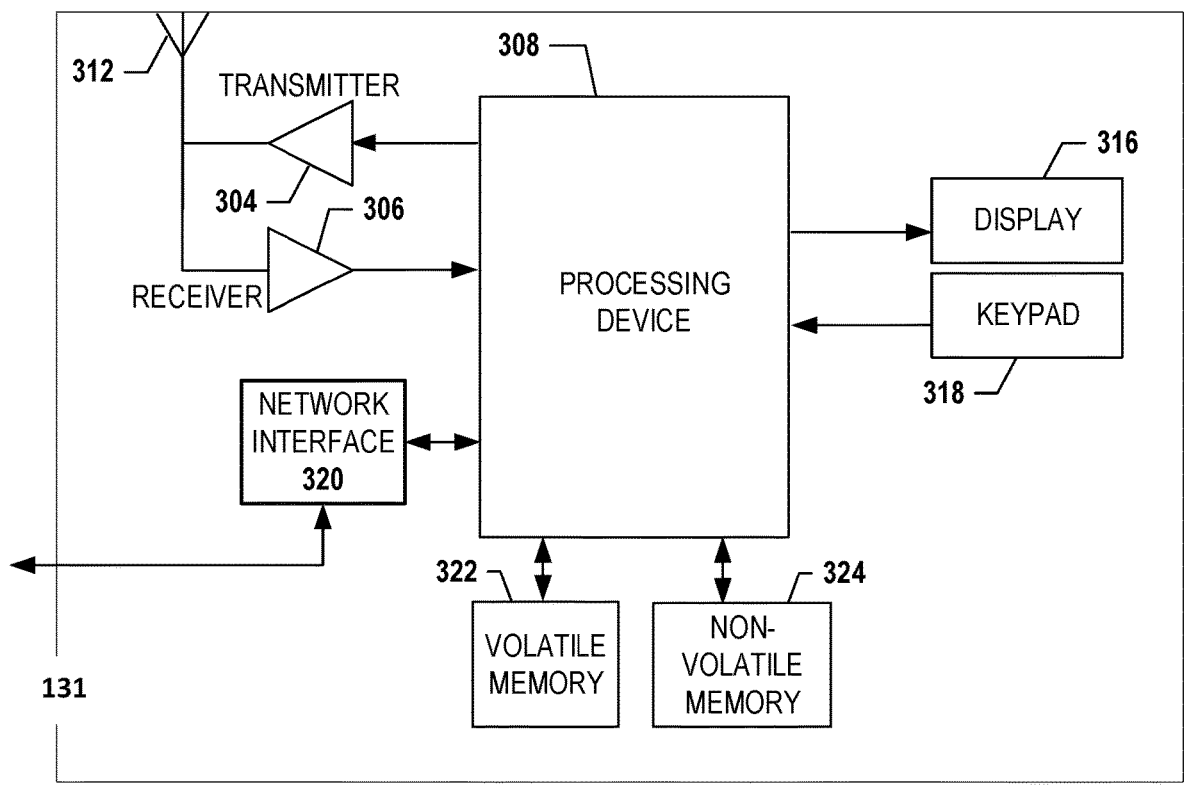

FIG. 3 illustrates an example external computing entity in accordance with some embodiments discussed herein.

Figure 4:
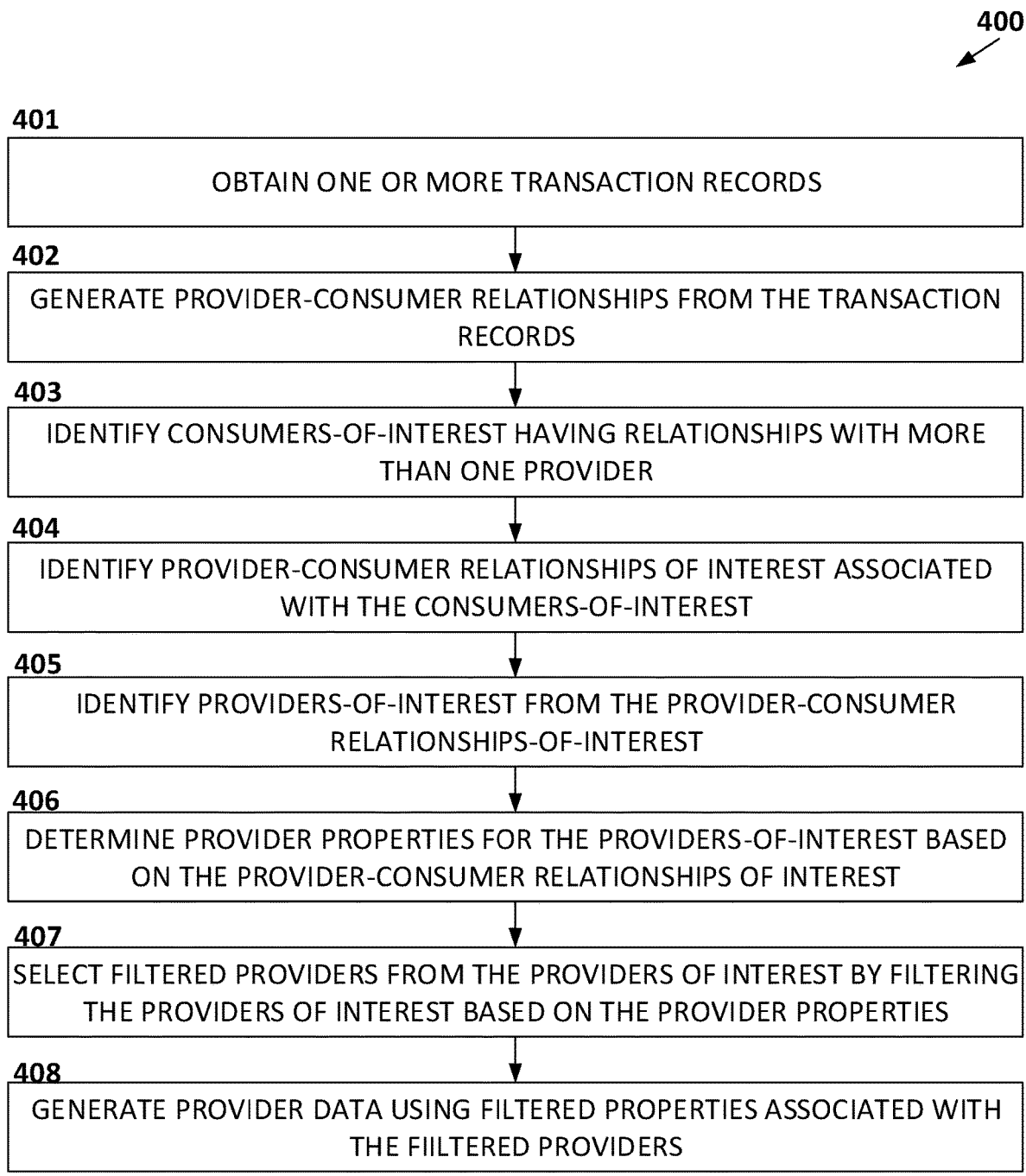

FIG. 4 depicts a flowchart diagram of an example process for generating provider data in accordance with some embodiments discussed herein.

Figure 5:
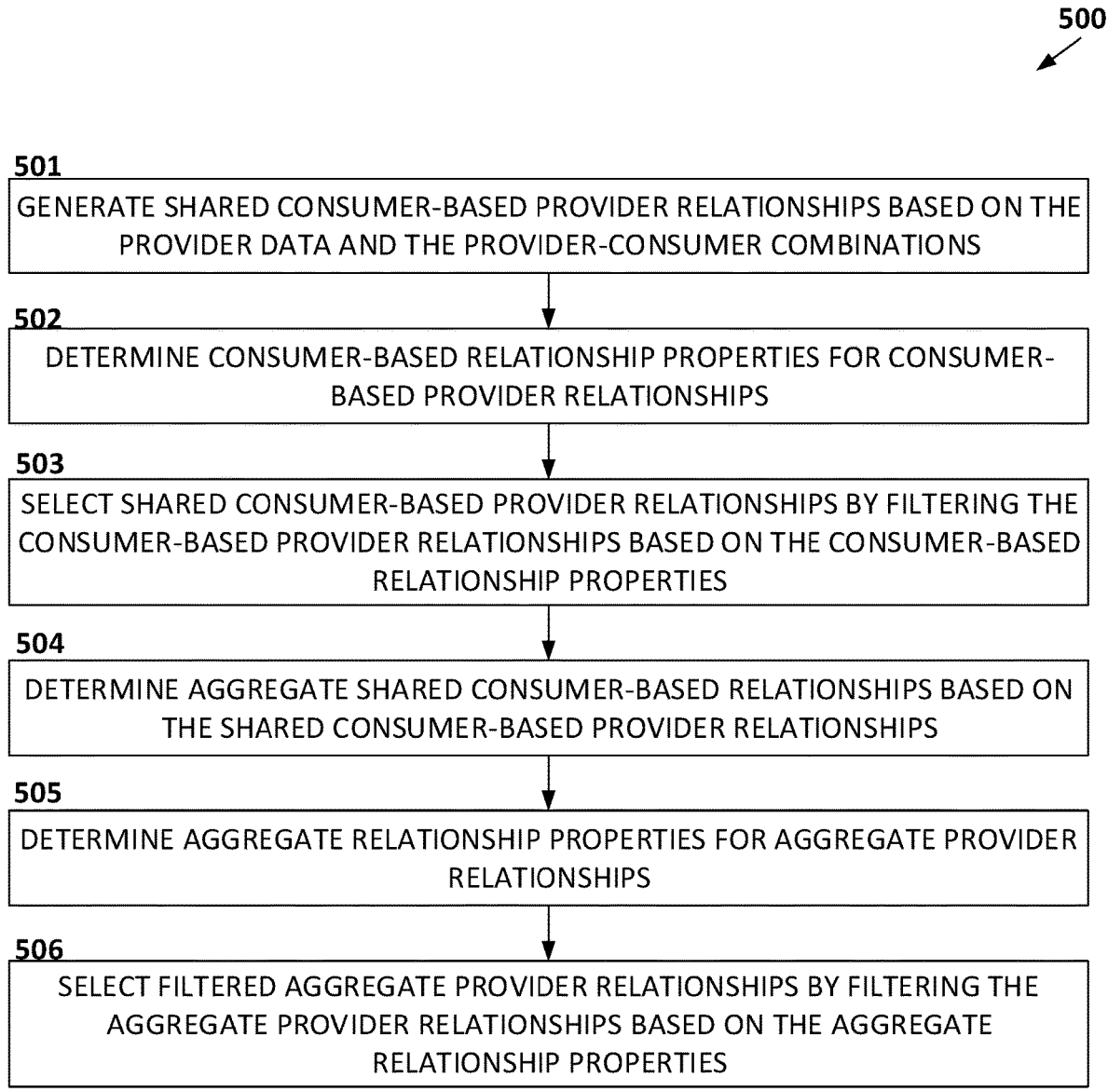

FIG. 5 depicts a flowchart diagram of an example process for generating relationship data in accordance with some embodiments discussed herein.

Figure 6:
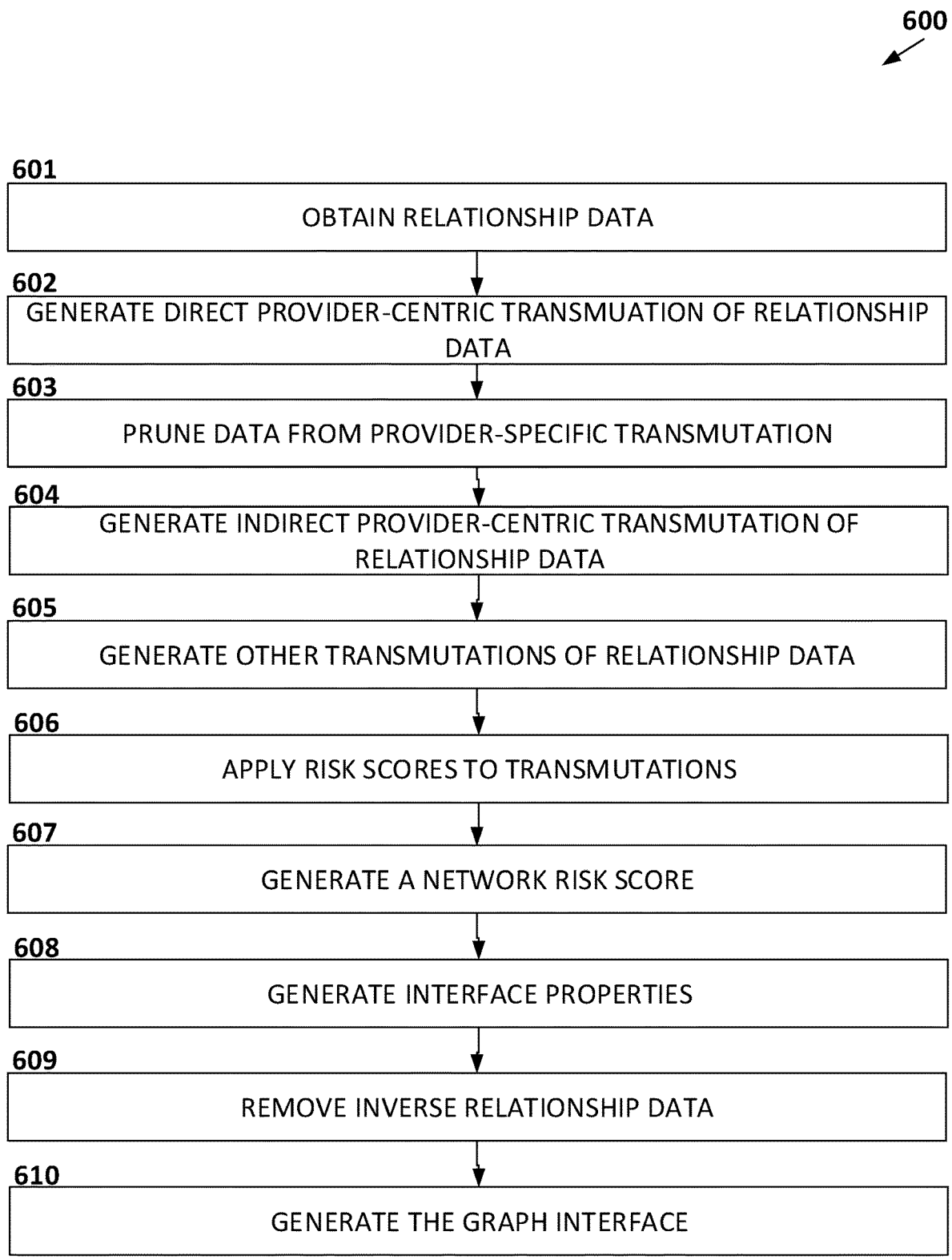

FIG. 6 depicts a flowchart diagram of an example process for generating a graph interface view for anomalous activity detection in accordance with some embodiments discussed herein.

Figure 7:
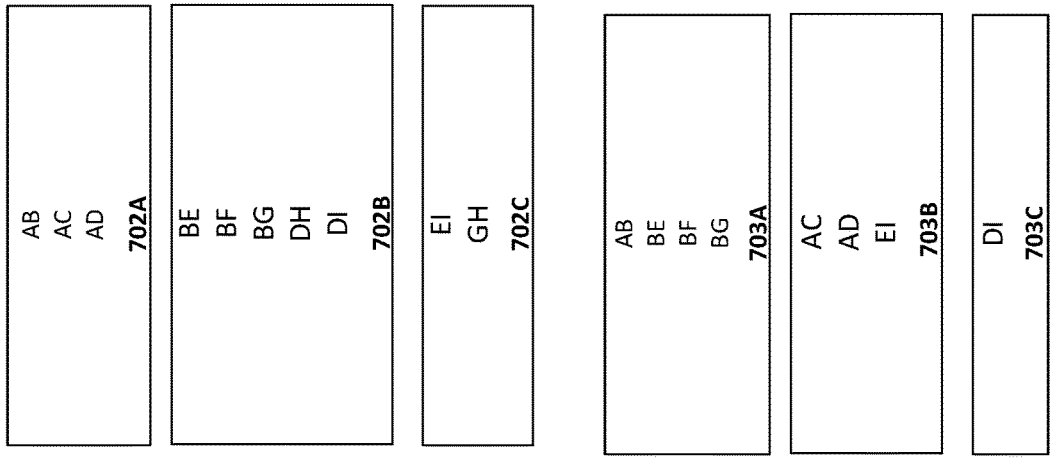
Figure 7:
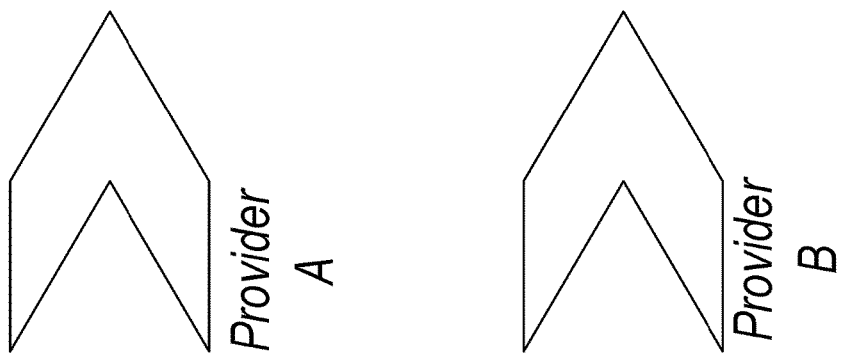
Figure 7:
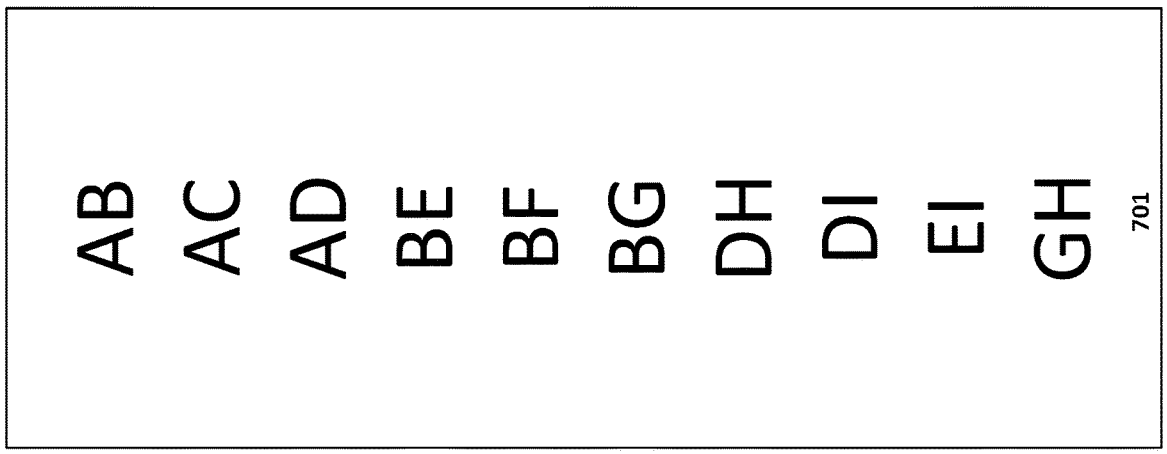

FIG. 7 provides an operational example of generating provider-centric transmutations of transactional data in accordance with some embodiments discussed herein.

Figure 8A:
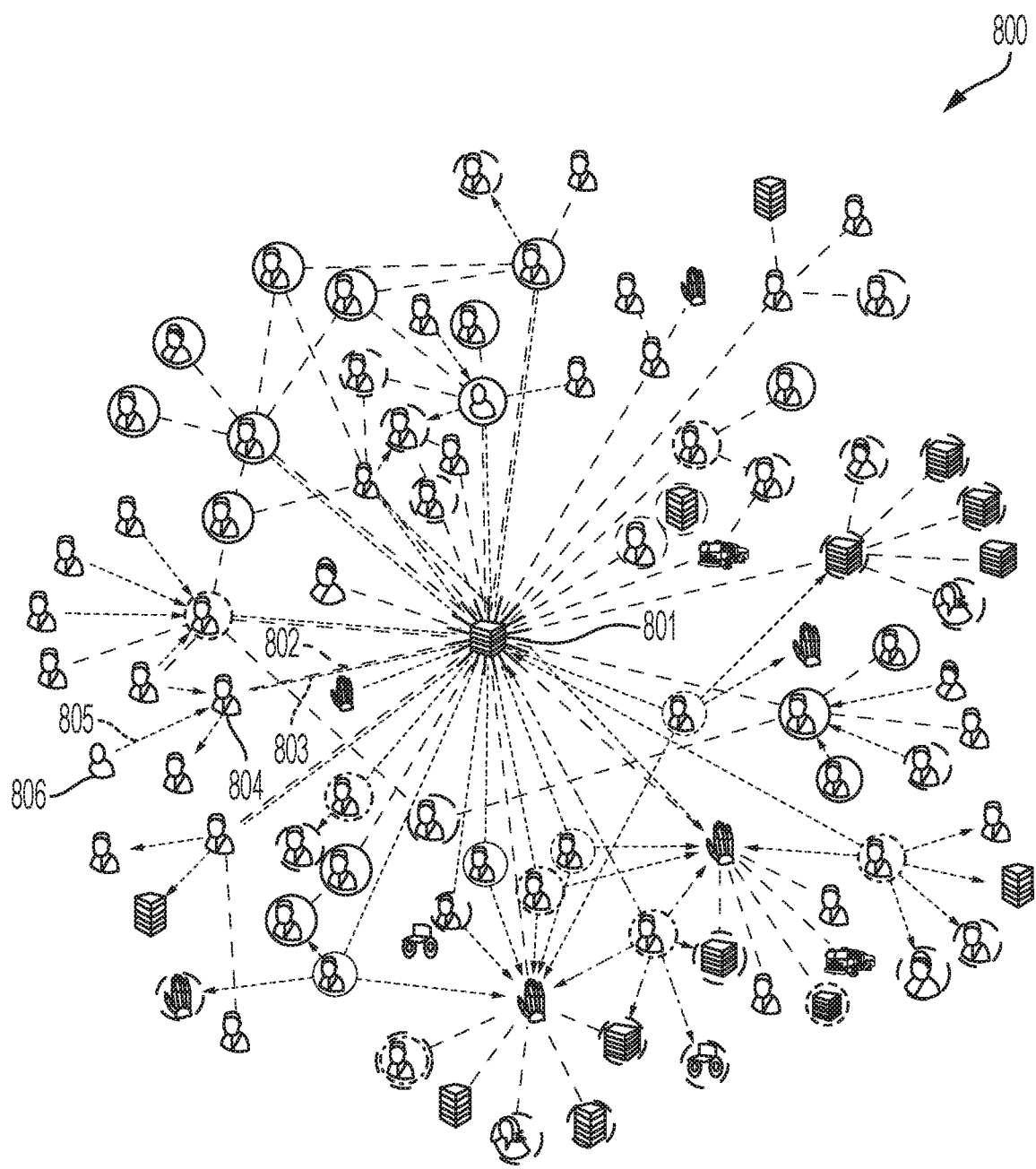
Figure 8B:
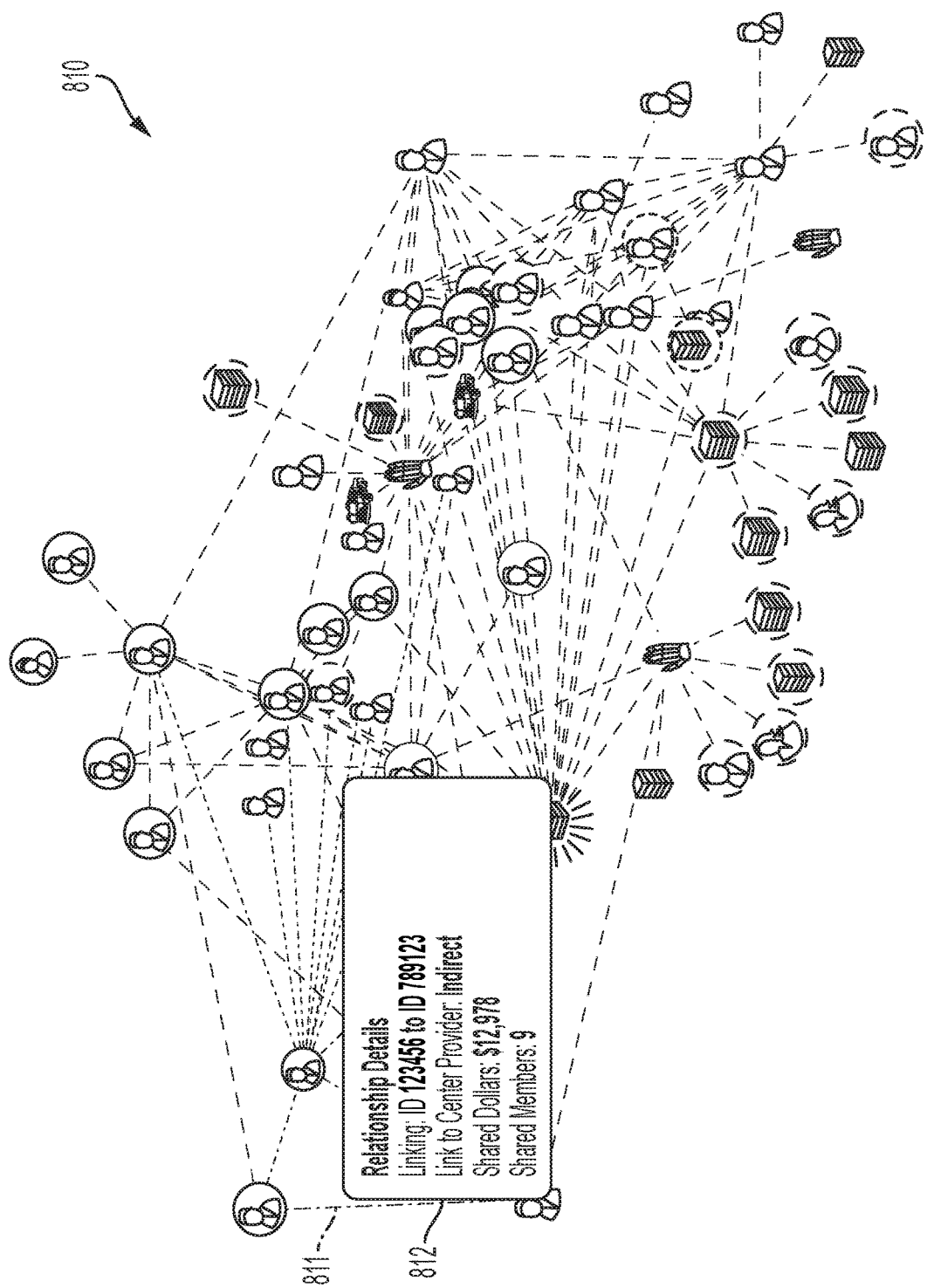
Figure 8C:
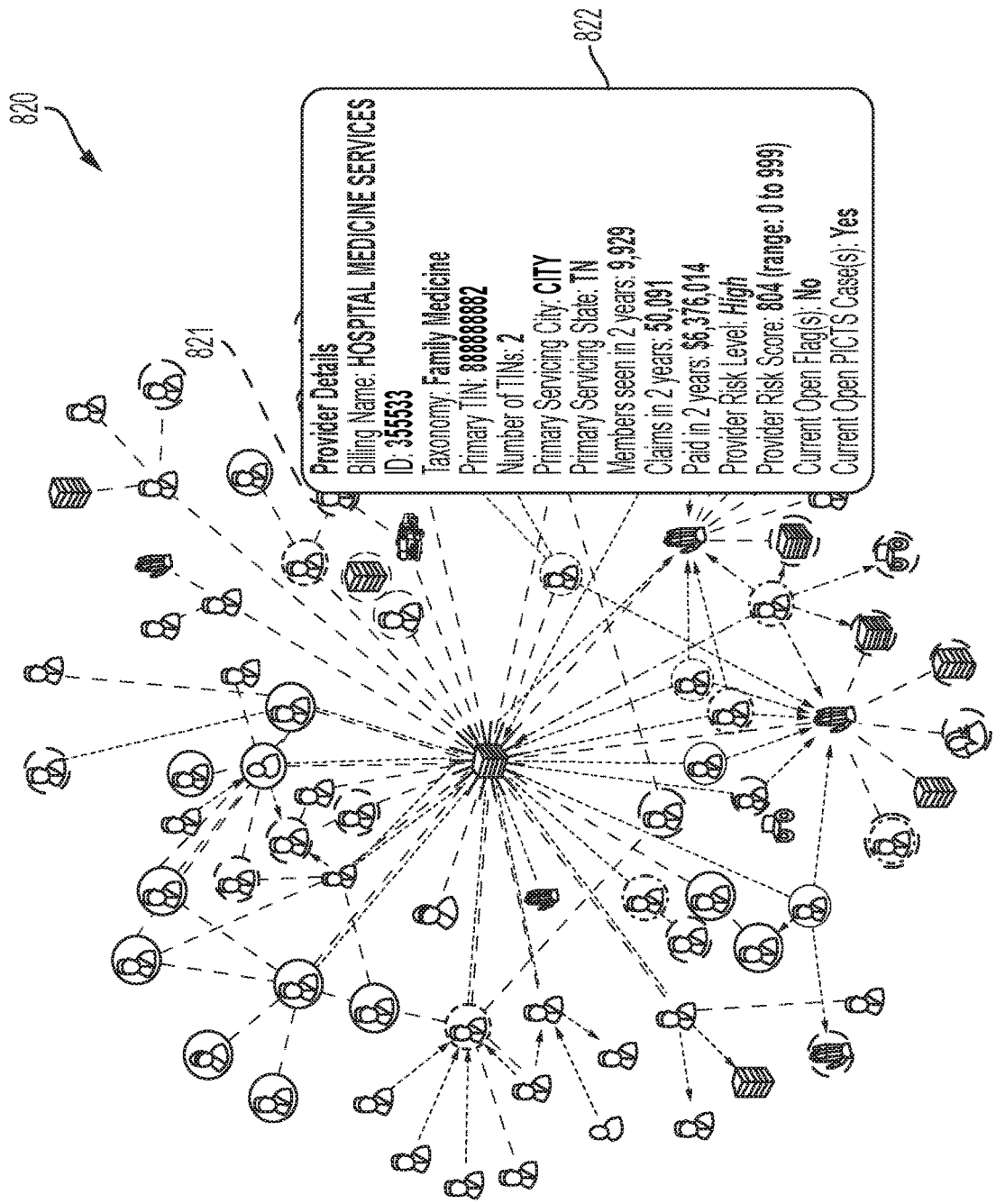

FIGS. 8A-8C provide operational examples of graph interface views in accordance with some embodiments discussed herein.

Figure 9:
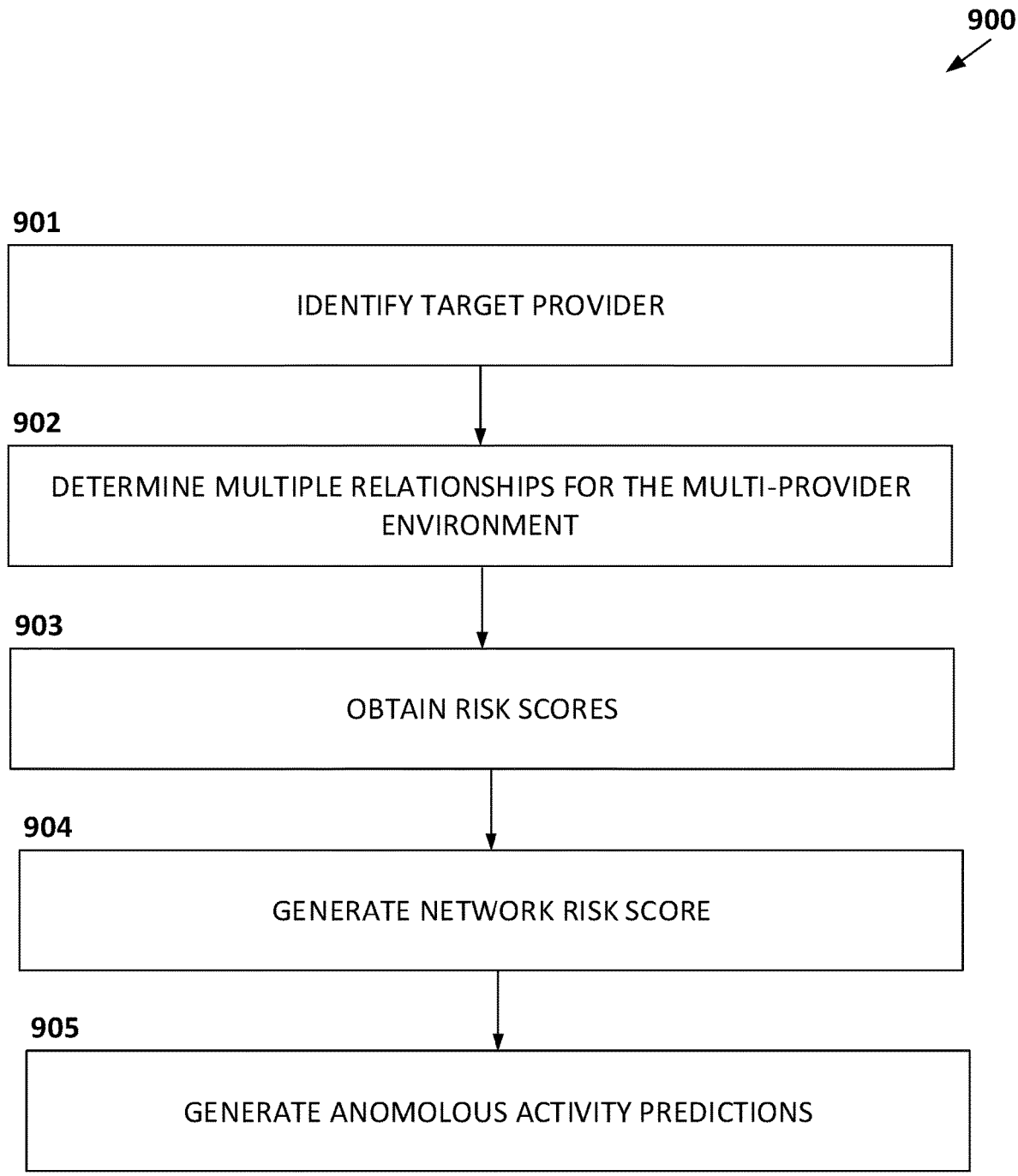

FIG. 9 depicts a flowchart diagram of an example process for generating a network risk score in accordance with some embodiments discussed herein.

Figure 10:
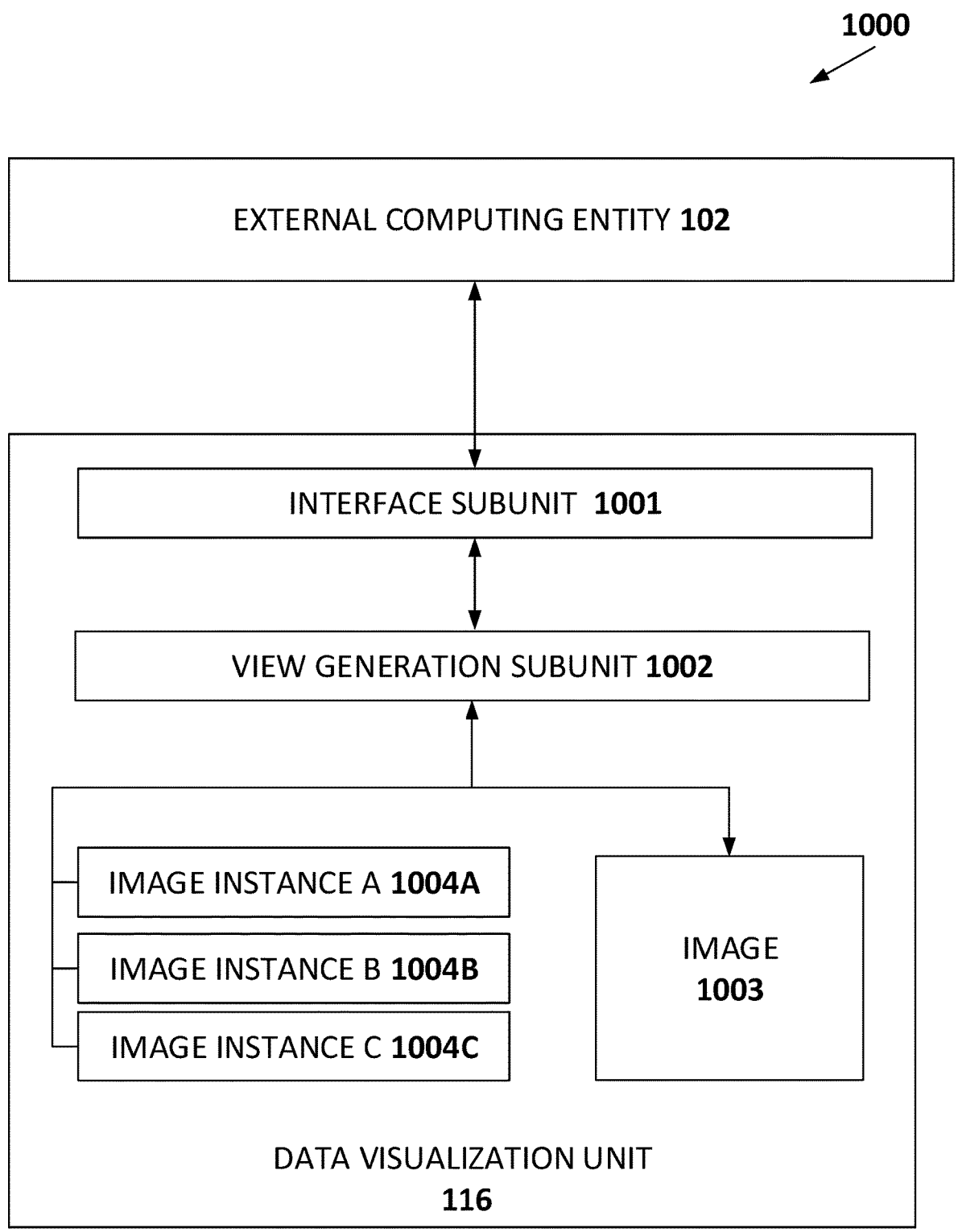

FIG. 10 depicts a data flow diagram of an example process for generating a browser-based graph interface in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW

Discussed herein methods, apparatus, systems, computing devices, computing entities, and/or the like for anomalous activity detection in multi-provider transactional environments. As will be recognized, however, the disclosed concepts can be used to perform other types of data analysis in multi-provider transactional environments, such as inferring consumer activity patterns and/or provider activity patterns in multi-provider transactional environments.

A. Technical Problems

Detecting anomalous activities, such as fraudulent activities, in multi-provider transactional environments is a technical challenge related to the fields of computational pattern recognition and predictive data analysis. Multi-provider transactional environments complicate detection of anomalous activities because they generate large amounts of transactional data that potentially point to numerous patterns of activities. The transactions reflected by the transaction data may be for one consumer or for many, the consumers may be independent or from the same household, employer plan, apartment building, or have some other relationship. Providers may also be sole practitioners, or have business partners, and may operate at multiple locations for the same business, or may participate in multiple business enterprises. Each particular provider generates numerous transactional patterns that may, depending on various contextual factors associated with the activities of the particular provider and other providers in the multi-provider transactional environment, point to anomalous activities or indicate legitimate activities. Because of the volume of transactional data, the multiplicity of provider actors, and the large number of inter-provider relationships, it is challenging to provide solutions that facilitate anomalous activity detection in multi-provider transactional environments. For example, it is challenging to provide metrics that accurately and effectively describe the likelihood of anomalous activities given particular transactional patterns in such environments. The transactional patterns themselves may be challenging to summarize and represent in a linkage analysis to identify providers who refer to other providers, who practice in the same geographic area or specialty, or have some other commonality. Moreover, it is also challenging to effectively model transactional data in order to make the task of processing such transactional data computationally manageable for existing data analytics systems. In the embodiment of the healthcare insurance marketplace, the interrelationships between providers such as submitting claims for common members or having provider identifiers co-located on a common claim may indicate significant information for the detection of fraudulent activity. Additional healthcare embodiments may include the relationships between multiple identifiers or attributes of the same provider, as well as relationships between providers and members.

Many existing solutions for fraud detection fail to properly address technical challenges related to anomalous activity detection in multi-provider transactional environments because of the large volumes of transactional data produced by such environments. For example, some existing solutions rely on machine learning models that use trained parameters to detect fraudulent activities. However, given the large number of transactional patterns typically found in transactional data for multi-provider transactional environments, many trained machine learning models may fail to capture all of those transactional patterns in a manner that facilitates effective and reliable detection of anomalous activities in multi-provider transactional environments. Moreover, at least with respect to some multi-provider transactional environments, a training module may not have access to a sufficient volume of training data needed to effectively train a machine learning model with requisite complexity and depth. As another example, some existing fraud detection solutions rely on predefined data mining transformations configured to generate conclusions about existence of fraudulent activities among transactional data. However, given the large size of transactional data typically generated in multi-provider transactional environments, such data mining solutions may be computationally inefficient when used to detect anomalous activities in larger and/or more active multi-provider transactional environments.

Moreover, in addition to challenges related to computational complexity of many existing data mining solutions for fraud detection, predefined data mining transformations may fail to properly capture all of the domain-specific computational pattern recognition logic relevant to detecting anomalous activities in particular multi-provider transactional environments. In many multi-environment transactional environments, inference of fraudulent or improper conduct may depend on domain-specific factors that cannot always be effectively modeled. For example, some transactional patterns may be anomalous in particular types of transactional environments, but may not be anomalous in other types of transactional environments. To further complicate the matter, such domain-specific computational pattern recognition concepts may not always be articulable in concrete programmable rules. Despite this, many existing fraud detection systems rely on general rules and inferential models that are rigid and cannot be adopted for cross-domain purposes. As a result, the effectiveness and accuracy of anomaly detection may suffer in many contexts because of absence of cross-domain customization functionalities.

Therefore, there is a continuing technical need for effective and efficient anomalous activity detection solutions for multi-provider transactional environments. In other words, there is a technical need for anomalous activity detection solutions that enable recognition of anomalous transactional patterns in multi-provider transactional environments in a manner that is both computationally efficient and adaptive to cross-domain applications. For example, there is a technical need for anomalous activity detection solutions that enable inferring anomalous activity patterns based on domain-specific rules related to inferring such patterns in multi-provider transactional environments of different types.

B. Technical Solutions

Various embodiments of the present invention address technological challenges related to detecting anomalous activities, such as fraudulent activities, in multi-provider transactional environments. For example, various embodiments of the present invention enable modeling a multi-provider transactional environment as one or more provider-centric networks each associated with one or more relationships of various relational proximity related to a target provider. Then, various embodiments of the present invention enable calculating a network risk score for a provider-centric network based on risk scores and network-based relationship scores associated with the relationships associated with the provider-centric network. As another example, various embodiments of the present invention enable generating provider-centric transmutations of transactional data for a master provider, where each provider-centric transmutation may be associated with relationships with a particular relational proximity to the master provider. Then, various embodiments of the present invention enable generating a graph interface view for the master provider using the data in each provider-centric translation associated with the master provider, where the graph interface view may be used to infer anomalous activity patterns among transactional data for a multi-provider transactional environment.

As noted above, various existing fraud detection solutions suffer from technical shortcomings related to the large number of transactional patterns generated in multi-provider transactional environments. Various embodiments of the present invention address those shortcomings. For example, various embodiments that relate to calculating a network risk score for a provider-centric network may generate the network risk score based on a combination of risk scores for particular relationships in the provider-centric network and network-based relationship scores for those particular relationships. Risk score for a relationship between two providers may be determined based on one or more of risk scores for providers associated with the relationship and/or risk scores for consumers that have provider-consumer relationship with both of the providers associated with the relationship. Moreover, network-based relationship scores for relationships may be determined based on relational proximity of the relationship to the target provider node associated with the particular provider-centric network. Thus, the network risk score for a provider-centric network may be determined based on factors both universal to the multi-provider transactional environment as a whole (e.g., provider risk scores and consumer risk scores) and factors specific to a localized view of the multi-provider transactional environment (e.g., relational proximities determined based on the provider-centric network for the target provider node). In this way, various embodiments of the present invention provide a powerful tool for modeling a large number of transactional patterns among transactional data for a multi-provider transactional environment. By utilizing such a powerful modeling tool, various embodiments of the present invention address technical shortcomings of existing fraud detection solutions related to the large number of transactional patterns generated in multi-provider transactional environments and provide technical solutions for detecting anomalous activity patterns in such multi-provider transactional environments.

Furthermore, as noted above, various existing solutions for fraud detection suffer from technical shortcomings related to lack of cross-domain applications of such fraud detection solutions. Various embodiments of the present invention address those technical shortcomings. For example, as enabled by various embodiments of the present invention, graph interface views generated based on provider-centric transmutations of transactional data associated with multi-provider transactional environments enable a computer user to (manually or automatically) apply domain-specific computational pattern recognition concepts configured to determine anomalous activity detection patterns. Moreover, some generated graph interface views may include user interface elements specifically adapted to highlight domain-specific concepts and features. For example, graph interface views may include user interface elements configured to indicate provider nodes types, relationship edge types, informational data associated with provider nodes, informational data associated with relationship edges, geographic integration features, etc. Thus, graph interface views enabled by various embodiments of the present invention provide a powerful tool for inferring anomalous activity patterns in multi-transactional environment, even when inference of such patterns requires domain-specific information and complex pattern recognition logic (e.g., complex, domain-specific pattern recognition logic). In this way, various embodiments of the present invention address technical shortcomings of existing fraud detection solutions related to lack of cross-domain applications in such solutions and provide technical solutions for detecting anomalous activity patterns in such multi-provider transactional environments.

Moreover, as noted above, various existing solutions for fraud detection suffer from technical shortcomings related to computational efficiency of those solutions. By creating a series of provider-specific ego-networks each centered around a particular provider in the set of eligible providers for analysis, the retrieval of information for each provider is simplified for the resulting end user information query through a user interface designed to be used by the knowledgeable but non-technical business user. Various embodiments of the present invention address those technical shortcomings. For example, provider-centric transmutations of transactional data (as enabled by various embodiments of the present invention) reduce a size of transactional data by filtering transactional data unrelated to master providers, thus reducing computational complexity of transactional data processing required for anomalous activity detection in multi-provider transactional environments. Moreover, in various embodiments of the present invention, to generate provider-centric transmutations of transactional data, the system generates multiple intermediate transformations of such data, at each level of transformation determining properties of data entries associated with the particular level and applying one or more filtering routines based on determined properties for the level. Therefore, the generated provider-specific transmutations may be a substantially preprocessed transmutation with reduced data fields. This is another way in which various embodiments of the present invention reduce computational complexity of transactional data processing. Thus, various embodiments of the present invention reduce computational complexity of anomalous activity detection in multi-provider transactional environments by reducing computational complexity of transactional data processing in such environments, e.g., by using provider-centric transmutations of transactional data, such as provider-centric transmutations generated using preprocessed transmutation with reduced data fields. In this way, various embodiments of the present invention address technical shortcomings of existing fraud detection solutions related to computation efficiency of those solutions and provide technical solutions for detecting anomalous activity patterns in such multi-provider transactional environments.

Therefore, various embodiments of the present invention address technical challenges related to one or more of large diversity of transactional patterns among transactional data generated by multi-provider transactional environments, domain-specific considerations relevant to effective anomalous activity detection based on transactional data in multi-provider transactional environments, and computational efficiency of anomalous activity detection based on transactional data in multi-provider transactional environments. Various embodiments address such technical challenges by utilizing various aspects of the present invention, such as determining network risk scores for provider-centric networks using risk scores and network-based relationship scores for relationships, generating graph-interfaces based on provider-centric transmutations of transactional data for multi-provider transactional environments, and preprocessing transactional data on many transformation levels to generate provider-centric transmutations of transactional data. Thus, various embodiments of the present invention provide technical solutions for detecting anomalous activity patterns in such multi-provider transactional environments. In this way, various embodiments of the present invention address technical challenge related to the fields of computational pattern recognition and predictive data analysis.

II. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. EXEMPLARY SYSTEM ARCHITECTURE

The architecture 100 includes one or more external computing entities, such as the external computing entity 102, which interacts with a data analytics system 101 (e.g. via a communication network). The data analytics system 101 includes a storage subsystem 114 and a data analytics computing entity 106. The data analytics computing entity 106 includes a data visualization engine 116 and an anomalous activity detection engine 117. The architecture 100 may include one or more communication networks, where a communication network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). Each computing entity, computing system, and/or computing resource in the architecture 100 may include one or more of any suitable network server and/or other type of processing device.

The architecture 100 may be configured to perform anomalous activity detection in a multi-provider transactional environment based on transactional data associated with the multi-provider transactional environment. A multi-provider transactional environment may be an environment in which a particular potential provider of multiple providers may engage in a transaction with (e.g., a transaction for delivery of a particular service to) a particular consumer of multiple potential consumers (e.g., a particular member of a medical insurance plan offered by a medical insurance company). For example, in a multi-provider medical services delivery environment with multiple potential medical providers, a particular medical provider may engage in a transaction with a particular consumer of medical services. As a party to the transaction with the particular consumer, the provider may be identified based at least in part on a unique identifier assigned to the provider, the provider's name, the provider's place of business, and/or other identifying information corresponding to the provider. The architecture 100 may be configured to perform anomalous activity detection in such a multi-provider medical services delivery environment. For example, the architecture 100 may be configured to detect anomalous patterns of referral between two or more medical providers in the multi-provider medical services environment and/or anomalous patterns of co-visitations by consumers of two or more medical providers in the multi-provider medical services environment. In this way, the architecture 100 may be configured to detect suspicious transactional patterns in a multi-provider medical services delivery environment in an effective, reliable, and computationally efficient pattern.

The data analytics system 101 is configured to receive requests related to detection of anomalous activities in a multi-provider transactional environment from the external computing entities. In response to a particular request related to detection of anomalous activities in a particular multi-provider transactional environment from a particular external computing entity 102, the data analytics system 101 may determine transactional data for the particular multi-provider transactional environment and use the determined transactional data for the particular multi-provider transactional environment to enable detection of anomalous activities in the particular multi-provider transactional environment. The data analytics system 101 may enable detection of anomalous activities in the particular multi-provider transactional environment through one or more of at least one network risk score associated with a provider-centric network in the particular multi-provider transactional environment and at least one graph interface view generated based on a provider-centric transmutation of transactional data for the particular multi-provider transactional environment. The data analytics system 101 may transmit data enabling enable detection of anomalous activities in the particular multi-provider transactional environment to the particular external computing entity 102.

The storage subsystem 114 is configured to store transactional data associated with the multi-provider transactional environment. Transactional data associated with the multi-provider transactional environment may include one or more transaction records for transactions in the multi-provider transactional environment, where each transaction record provides information about a transaction between a provider in the multi-provider transactional environment and a consumer in the multi-provider transactional environment (e.g., information about a time of the transaction, a cost of the transaction, a type of the transaction, a payment status of the transaction, etc.). Additional data related to the entities in the transactional data may also be obtained and stored. This information may include but is not limited to National Plan and Provider Enumeration System (NPPES) National Provider Identifier (NPI) number identity properties, LEIE (list of excluded individuals and entities) provider lists and other risk factor or identity related information. The storage subsystem 114 may further store one or more transformations and/or one or more transmutations of the stored transaction records, such as processed transactional data generated based on the transaction records and/or one or more provider-centric transmutations of the processed transactional data.

The storage subsystem 114 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. In some embodiments, the storage subsystem 114 may be configured to store a relational database, such as MySQL database. In some embodiments, the storage subsystem 114 may be configured to store a non-relational database, such as JSON database or a NOSQL database.

The data analytics computing entity 106 is configured to process the transactional data associated with the multi-provider transactional environment to generate data configured to enable anomalous activity detection in the multi-provider transactional environment. For example, the data visualization engine 116 of the data analytics computing entity 106 is configured to generate one or more graph interface views based on provider-centric transmutations of transactional data for the multi-provider transactional environment, where the one or more graph interface views may enable anomalous activity detection in the multi-provider transactional environment. In some embodiments, the data visualization engine 116 is configured to receive (e.g., using a background process, such as a daemon process) a request for one or more graph interface views designating one or more master providers from an external computing entity 102. In response, the data visualization engine 116 may process transactional data for the multi-provider transactional network to generate, for each master provider of the one or more master providers, one or more provider-centric transmutations of the transactional data, e.g., by using a virtualization (e.g., Docker) process for each provider-centric transmutation associated with a provider-centric transmutation for a master provider. Furthermore, the data visualization engine 116 may generate, for each for each master provider of the one or more master providers, a graph interface view for the master provider using one or more provider-centric transmutations of the transactional data associated with the master provider, e.g., by using a virtualization process for each master provider. Moreover, the data visualization engine may present each graph interface view associated with a master provider to the external computing entity 102, e.g., by presenting the HTML code for each graph interface view to a computer application on the external computing entity 102.

In addition, the anomalous activity detection unit 117 of the data analytics system 101 is configured to generate one or more anomalous activity risk metrics for the multi-provider transactional network, e.g., one or more network risk scores for the multi-provider transactional environment. For example, the anomalous activity detection unit 117 may receive a request to determine one or more network risk scores for the multi-provider transactional environment from a particular external computing entity 102, where the request designates one or more target providers. In response, the anomalous activity detection unit 117 may generate, for each target provider of the one or more target providers, a provider-centric network for the target provider (e.g., based on a graph interface view for the target provider generated by the data visualization engine 116). Furthermore, the anomalous activity detection unit 117 may determine a network risk score for each particular provider-centric network based on each respective risk score and network-based relationship score for at least some of the relationships associated with the particular provider-centric network. Moreover, the anomalous activity detection unit 117 may transmit each determined network risk score to the particular external computing entity 102, e.g., in combination with the graph interface views associated with the one or more target providers.

In some embodiments, the data visualization unit 116 of the data analytics system 101 generates a graph user interface that is configured to be displayed in a web browser application (e.g., a web browser application installed on a personal computer and/or on a smartphone). FIG. 10 provides a data flow diagram of an example process 1000 for generating such a browser-based graph interface. As depicted in the process 1000, an interface subunit 1001 of the data visualization unit 116 is configured to obtain a request for displaying a browser-based graph interface from an external computing entity A 102A. For example, the interface subunit 1001 may execute a daemon process configured to receive such requests for displaying a browser-based graph interface. The request may include one or more network addresses for the external computing entity 102 and/or indications of one or more properties for a desired graph interface, such as a designation of a master provider associated with the graph interface. In response to receiving the request for a displaying a browser-based graph interface, the interface subunit 1001 sends a request to a view generation subunit 1002 to generate the browser-based graph interface. The view generation subunit 1002 may run a deamon process to receive requests from the interface subunit 1001.

To generate a particular browser-based graph interface associated with a particular display request, the view generation subunit 1002 may retrieve an image 1003, which may be the combination of code and data needed to generate any graph-based interface for anomaly detection related to the multi-provider transactional environment using transaction data for the environment. The view generation subunit 1002 may then generate, for each particular external computing entity 102 and/or particular user profile seeking execution of a display request, an instance 1004A-C of the image 1003 (e.g., a container for the image, such as a Docker container). The image instance 1004A-C may include a self-contained portion of data and code required to process the particular display request given one or more properties and/or data fields associated with the request. After creating the image display for a display request, the view generation subunit 1002 may utilize the image instance to generate a graph display in response to the display request, e.g., using a web-browser, via virtualization, and without the need for execution of applications other than the web browser on the external computing entity 112 associated with the display request.

A. Exemplary Data Analytics Computing Entity

FIG. 2 provides a schematic of a data analytics computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, televisions, dongles, cameras, wristbands, wearable items, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the data analytics computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the data analytics computing entity 106 may include or be in communication with one or more processing elements 205 (also referred to as processors, processing circuitry, and/or similar terms used herein interchangeably) that communicate with other elements within the data analytics computing entity 106 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers.

Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the data analytics computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, object model, semantic model, graph model, and/or the like.

In one embodiment, the data analytics computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the data analytics computing entity 106 with the assistance of the processing element 205 and operating system.

As indicated, in one embodiment, the data analytics computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the data analytics computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the data analytics computing entity 106 may include or be in communication with one or more input elements, such as a keyboard input, a mouse input, a touch screen/display input, motion input, movement input, audio input, pointing device input, joystick input, keypad input, and/or the like. The data analytics computing entity 106 may also include or be in communication with one or more output elements (not shown), such as audio output, video output, screen/display output, motion output, movement output, and/or the like.

As will be appreciated, one or more of the management computing entity's 100 components may be located remotely from other data analytics computing entity 106 components, such as in a distributed system. Furthermore, one or more of the components may be combined and additional components performing functions described herein may be included in the data analytics computing entity 106. Thus, the data analytics computing entity 106 can be adapted to accommodate a variety of needs and circumstances. As will be recognized, these architectures and descriptions are provided for exemplary purposes only and are not limiting to the various embodiments.

B. Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, RFID tags, ear pieces, scanners, televisions, dongles, cameras, wristbands, wearable items, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Provider computing entities 102A-D can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the data analytics computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the data analytics computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the user computing entity's 121 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information from the data analytics computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the data analytics computing entity 106 and/or various other computing entities.

In another embodiment, the external computing entity 102 may include one or more components or functionality that are the same or similar to those of the data analytics computing entity 106, as described in greater detail above. As will be recognized, these architectures and descriptions are provided for exemplary purposes only and are not limiting to the various embodiments.

IV. EXEMPLARY SYSTEM OPERATION

The operation of various embodiments of the present invention will now be described. As discussed herein, various embodiments are directed to methods, apparatus, systems, computing devices, computing entities, and/or the like for anomalous activity detection in multi-provider transactional environments. In various embodiments, various embodiments of the present invention enable anomalous activity detection in multi-provider transactional environments using one or more of pre-processing transactional data for multi-provider transactional environments, generating graph interface views using provider-centric transmutations of transactional data for multi-provider transactional environments, and generating network risk scores for provider-centric networks in multi-provider transactional environments.

A. Preprocessing Transactional Data

Preprocessing of raw transactional data may be performed by the data analytics computing entity 106, for example by the data visualization engine 116 of the data analytics computing entity 106, the anomalous activity detection engine 117 of the data analytics computing entity 106, or both. Preprocessed transactional data may be stored in the storage subsystem 114 of the data analytics computing entity 106 for future use. For example, the data visualization engine 116 may generate preprocessed transactional data and store such preprocessed transactional data for future use by the data visualization engine 116 and/or by the anomalous activity detection engine 117. Stored preprocessed data may be stored for a particular period of time from a time of preprocessing, after which transactional data may be reprocessed. An objective of preprocessing of transactional data may be to reduce size of transactional data in order to reduce the computational complexity of anomalous activity detection, e.g., the computational complexity of generating graph interface views and/or the computational complexity of generating network risk scores. Another objective of preprocessing of transactional data may be to perform such preprocessing in a manner that is sufficiently parallelizable in order to utilize parallel computing capabilities and increase computational efficiency of anomalous activity detection.

In some embodiments, preprocessed transactional data may include at least one of: (i) one or more provider data items each including one or more information items about a provider of the multi-provider transactional environment (e.g., a unique provider identifier; a provider name; a provider work location; and/or the like); and (ii) one or more relationship data items each including one or more information items about a relationship between two providers of the multi-provider transactional environment. To generate the provider data items and/or the relationship data items, the data analytics computing entity 106 may use a variety of data sources, e.g., one or more data sources instead of and/or in addition to transaction records in the raw transactional data. However, in some embodiments, the data analytics computing entity 106 uses transaction records in the raw transactional data to generate the one or more provider data items and/or one or more relationship data items. To generate the provider data items and/or the relationship data items using transaction records in the raw transactional data, the data analytics computing entity 106 may apply one or more transformations to the transaction records in the raw transactional data.

FIG. 4 depicts a flowchart diagram of an example process 400 for generating provider data items using transactional data. The various steps/operations of process 400 may be performed by a system of one or more computers, e.g., the data analytics system 101 of FIG. 1. Via the various steps/operations of FIG. 4, the data analytics system 101 can generate provider data items each corresponding to a provider of a multi-provider transactional environment using transaction records for the multi-provider transactional environment.

Process 400 starts at step/operation 401 by obtaining one or more transaction records in the transactional data. As just one example, the data analytics computing entity 106 may access healthcare claims data (when utilized in a healthcare context), or another data source in a relational database. In certain embodiments, the data analytics computing entity 106 may obtain one or more transaction records, where each transaction record indicates one or more transaction properties associated with a transaction between a particular provider of the multi-provider network and a particular consumer of the multi-provider network. The transaction properties for a particular transaction may include one or more of a time of the particular transaction, a cost of the particular transaction, a type of the particular transaction, a payment status of the particular transaction, secondary parties to the particular transaction, location and identity of the billing, servicing, referring and rendering providers, location and identity of the consumer, etc. For example, the type of a particular transaction may be a claim for medical care provided by a primary care provider, or a referral from one medical provider to another.

In some embodiments, a transaction associated with the multi-provider transactional environment is deemed a most elementary type of relationship that indicates a one-time relationship between a particular provider and a particular consumer. If the data analytics computing entity 106 were to analyze transactional data on a transaction level, the data analytics computing entity 106 may likely fail to perform data analytics at a sufficiently efficient level. This may be because the transactional data at the transactional level may include an excessively large amount of data, some of which may be not particularly useful for particular data analytics tasks and/or may be more useful for particular data analytics tasks at higher levels of sophistication. Therefore, in order to enhance computational efficiency associated with data analytics tasks related to the multi-provider transactional environment (e.g., anomalous activity detection in the multi-provider transactional environment), the data analytics computing entity 106 may preprocess the transactions to generate preprocessed transactional data. Without this processing, the retrieval of information would exceed expected user interface response times and would generate timeout errors. It would also create a server query load that would be burdensome to system administrators and service level expectations would not be met. Without preprocessing, there would also be an increase the complexity of the queries to be performed to generate the expected result.

At step/operation 402, the data analytics computing entity 106 generates provider-consumer relationships from the transaction records. These generated provider-consumer relationships may be populated in a list, for example, or any other storage relationship. For example, the data analytics computing entity 106 may determine, from each of the transaction records associated with a particular provider and consumer pair that a provider consumer relationship exists for this pair. In some embodiments, the data analytics computing entity 106 may further determine one or more provider-consumer properties for each particular provider-consumer relationship based on the one or more transaction properties for the transaction associated with the provider-consumer relationship.

At step/operation 403, the data analytics computing entity 106 identifies one or more consumers of interest associated with the multi-provider transactional environment, wherein each consumer of interest is associated with more than one provider of the multi-provider transactional environment. For example, a new list may be generated, reflecting only those consumers having a relationship with more than one provider. Such a new listing may reflect all consumers who may be eligible for establishing relationships between multiple providers (e.g., a single consumer may be shared between multiple providers, thereby establishing a relationship between these multiple providers based on having at least one shared consumer). As a corollary, consumers who have only visited a single provider cannot be used to establish relationships between multiple providers, since there is no known relationship between multiple providers, and therefore these consumers are not identified as consumers-of-interest. In some embodiments, the data analytics computing entity 106 determines, for each consumer of the multi-provider transactional environment, a count of unique providers that have provider-consumer relationships with the consumer based on the provider-consumer relationships. The data analytics computing entity 106 may then identify consumers of the multi-provider transactional environment whose respective count of unique providers exceeds one, who have a total transaction value above a certain threshold, transactions of a certain type or status, and/or the like.

In some embodiments, step/operation 403 may be performed at least in part using parallel computing. For example, the data analytics computing entity 106 may divide the consumers of the multi-provider transactional environment into n groups and generate n respective copies of a file that includes indications of all of the provider-consumer relationships. Then, the data analytics computing entity 106 may cause the performance of n parallel processes each configured to determine counts of unique providers for a respective group of the consumers of the multi-provider transactional environment. In another example, the data analytics computing entity 106 may divide data fields corresponding to all of the provider-consumer relationships into m groups of data fields. Then, the data analytics computing entity 106 may cause the performance of n parallel processes each configured to determine counts of unique providers for consumers of the multi-provider transactional environment each based on the respective groups of data fields associated with the particular parallel process. Afterward, the data analytics computing entity 106 may aggregate multiple counts of unique providers for a particular consumer each calculated by a respective parallel process to determine an overall count of unique providers for the particular consumer.

At step/operation 404, the data analytics computing entity 106 identifies provider-consumer relationships of interest from the provider-consumer relationships generated in step/operation 402. In some embodiments, the data analytics computing entity 106 filters the provider-consumer relationships to exclude those relationships that do not include a consumer of interest identified in step/operation 403. For example, where a listing of consumers of interest (e.g., consumers having relationships with more than one provider) is provided, this listing may be utilized to subset the listing of all provider-consumer combinations so as to only include those provider-consumer combinations in which at least one of the consumers of interest is a relationship participant. As suggested above, such processes may reduce the total amount of data for processing, by removing those provider-consumer pairs that cannot be utilized to establish relationships among multiple providers (e.g., based on a shared member between those providers). In some embodiments, step/operation 404 may be performed at least in part using parallel computing, e.g., by dividing the consumers of interest into i groups, generating i respective copies of a file that includes indications of all of the provider-consumer relationships, and causing execution of i parallel processes to extract provider-consumer relationships associated with a respective group of consumers of interest from a respective copy of the file; or by dividing provider-consumer relationship data fields into j groups, causing execution of j parallel processes to extract a group of provider-consumer relationships of interest, and merging the j extracted groups of provider-consumer relationships of interest.

Next, the data analytics computing entity 106 generates provider nodes and applies filters prior to substantive analysis based on user-provided filtering criteria. Such steps may ensure that extra, unnecessary data is not being processed, which may slow down the overall process and which may ultimately generate a cluttered or otherwise unusable user output with more information than can be reasonably be comprehended by a user. Such steps are reflected specifically at steps/operations 405-408.

Specifically, at step/operation 405, the data analytics computing entity 106 identifies providers of interest from the provider-consumer relationships of interest. In essence, this may be considered to establish a master listing of providers eligible for further analysis based on the prior steps/operations according to various embodiments. A provider that did not have consumers that have transactions with other providers would not appear in this result set. In some embodiments, the data analytics computing entity 106 determines each unique provider among the provider-consumer relationships of interest as a provider of interest. In some embodiments, step/operation 405 may be performed at least in part using parallel computing, e.g., by dividing a file that includes indications of all of the provider-consumer relationships of interest into r groups, causing execution of r parallel processes each configured to extract providers of interest from a group of the r groups, aggregating the providers of interest extracted by each process of the r processes, and removing any duplicate indications of providers of interest from the aggregated providers of interest.

At step/operation 406, the data analytics computing entity 106 determines, for each provider of interest identified in step/operation 405, one or more provider properties. These properties may be self-determined by the data analytics computing entity 106 (e.g., by counting the number of consumer relationships attributable to a particular provider) or may be determined by retrieving additional data regarding the providers (e.g., by retrieving additional data indicative of the average amount paid to the provider for a particular visit). The one or more provider properties for a provider of interest may include one or more of a total cost incurred by one or more consumers of interest in the multi-provider transactional environment through engaging in one or more transactions with the provider of interest (i.e., a cost determination for the provider of interest) and a number of consumers of interest in the multi-provider transactional environment that have engaged in one or more transactions with the provider of interest (i.e., a consumer quantity determination for the provider of interest).

In some embodiments, the data analytics computing entity 106 may determine a cost determination for a provider of interest by determining a measure of summation of each cost determination for any provider-consumer relationship of interest that is associated with the provider of interest. In some embodiments, the data analytics computing entity 106 may determine a consumer quantity determination for a provider of interest by determining a measure of a count of provider-consumer relationships of interest that are associated with the provider of interest, e.g., a measure of count of all provider-consumer relationships associated with the provider of interest, a measure of count of provider-consumer relationships with unique consumer identifiers associated with the provider of interest, and a measure of count determined by combining a count of provider-consumer relationships with unique consumer identifiers associated with the provider of interest adjusted using a first adjusting value and a count of provider-consumer relationships with non-unique consumer identifiers associated with the provider of interest adjusted using a second adjusting value. In some embodiments, the data analytics computing entity 106 may determine one or more properties associated with a provider of interest at least in part using parallel computing, e.g., by dividing the provider-consumer relationships of interest into k groups, where each group is configured to be processed by a parallel process of k parallel processes; or by dividing the providers of interest into l groups, where each group is each configured to be processed by a parallel process of l parallel processes.

At step/operation 407, the data analytics computing entity 106 selects a subset of providers from the providers of interest identified in step/operation 405 (this subset of providers being referred to as filtered providers). These filtered providers may constitute a subset of the providers of interest selected during prior steps, thereby creating a filtered listing of providers for further analysis. In some embodiments, the data analytics computing entity 106 selects the filtered providers by filtering the providers of interest based on at least one of the one or more properties determined for each provider of interest in step/operation 406. For example, the data analytics computing entity 106 may filter out providers of interest whose corresponding cost determination fails to exceed a cost threshold. As another example, the data analytics computing entity 106 may filter out providers of interest whose consumer quantity determination fails to exceed a quantity threshold. By applying filters such as cost filters and/or quantity filters, the data analytics computing entity 106 may exclude from further analysis those providers whose pattern of activity is deemed to be insufficiently predictive and/or insufficiently pattern-inducing. In doing so, the data analytics computing entity 106 may reduce the computational cost of future transactional data processing tasks, e.g., transactional data processing tasks for generating graph interface views and/or transactional data processing tasks for generating network risk scores. In some embodiments, step/operation 407 may be performed at least in part using parallel computing, e.g., by dividing the providers of interest into a groups, where each group is configured to be processed by a parallel process of a parallel processes; or by dividing the filters into b groups, where each group is each configured to be executed by a parallel process of b parallel processes.

At step/operation 408, the data analytics computing entity 106 generates provider data using the filtered providers selected in step/operation 407. In some embodiments, the data analytics computing entity 106 generates provider data by combining indications of one or more filtered providers and, for each filtered provider of the one or more filtered providers, one or more filtered provider properties for the filtered provider, e.g., determined based on one or more provider properties for the filtered provider determined in step/operation 406. In some embodiments, the provider data includes identifications of one or more providers in the multi-provider transactional environment whose respective transactions are most deemed relevant to determining to anomalous activity detection. Such data may be retrieved from industry data sources such as healthcare industry provider fraud exclusion lists, national provider identifier demographic characteristics, and other data sources may also be utilized, as well as corporate specific information on fraud, waste, and error and associated predictive models for the identification of such activity. In some embodiments, the provider data includes one or more provider properties for each provider of one or more providers in the multi-provider transactional environments, where the properties may be used to generate graph interface views and/or network risk scores.

FIG. 5 depicts a flowchart diagram of an example process 500 for generating relationship data using transactional data. The various steps/operations of process 500 may be performed by a system of one or more computers, e.g., the data analytics system 101 of FIG. 1. Via the various steps/ operations of process 500, the data analytics system 101 can generate relationship data items each corresponding to a relationship in a multi-provider transactional environment, e.g., using provider data generated based on transactional data in step/operation 408 of process 400 in FIG. 4 and/or using provider-consumer relationships of interest generated based on transactional data in step/operation 405 of process 400.

The process 500 begins at step/operation 501 by generating consumer-based provider relationships and corresponding relationship data based on the provider data generated in step 408 of process 400 of FIG. 4 and the provider-consumer relationships of interest selected in step 405 of process 400. In embodiments in which a relational database is utilized to provide features similar to those of a graphical database, these consumer-based provider relationships may be utilized to create an "edge" table between "nodes" (reflective of relationships (edges) between individual providers (nodes)). In some embodiments, the data analytics computing entity 106 determines one or more providers based on the provider data. Then, for each provider, the corresponding provider-consumer relationships of interest are used to generate a consumer-based provider relationship for every pair of providers and a particular consumer.

For example, if the provider-consumer relationships of interest include a first provider-consumer relationship between provider P1 and consumer C1, a second provider-consumer relationship between the provider P2 and consumer C1, a third provider-consumer relationship between provider P1 and consumer C2, and a fourth provider-consumer relationship between provider P3 and consumer C2, the data analytics computing entity 106 may generate the following consumer-based provider relationships based on the noted provider-consumer relationships of interest: (i) a shared consumer-based provider relationship for the pair of providers P1 and P2 and the consumer C1 (i.e., a shared consumer-based provider relationship corresponding to the first provider-consumer relationship and the second provider-consumer relationship); and (ii) a second shared consumer-based provider relationship for the pair of providers P1 and P3 and the consumer C2 (i.e., a shared consumer-based provider relationship corresponding to the first provider-consumer relationship and the second provider-consumer relationship).

In some embodiments, step/operation 501 may be performed at least in part using parallel computing, e.g., by dividing the provider-consumer relationships of interest into c groups, where each group is configured to be processed by a parallel process of c parallel processes; or by dividing the possible combinations of pairs of providers and consumers into d groups, where provider-consumer relationships for each group is configured to be determined by a parallel process of d parallel processes. In some embodiments, by generating relationships based on pairs of providers, the data analytics computing entity 106 can process the transaction data at a higher level of sophistication (i.e., a pair-provider level), thus enabling additional application of additional filters to reduce computational cost of transactional data processing.

Next, the data analytics computing entity 106 aggregates a plurality of individual relationship characteristics between providers, effectively creating a summary of the total number of individual relationship between providers reflected by the relationship data. For example, two providers may be linked by several shared consumers (each consumer establishing its own individual relationship between those providers), and accordingly the data analytics computing entity 106 may aggregate characteristics of each of those individual relationships to provide an overall summary of those relationships according to certain embodiments. As just one non-limiting example, aggregated relationship characteristics may be indicative of the total number of shared consumers between pairs of providers. Such steps/operations are reflected at steps/operations 502-505 of FIG. 5.

At step/operation 502, the data analytics computing entity 106 determines, for each consumer-based provider relationship generated in step/operation 501, one or more consumer-based relationship properties. In some embodiments, the data analytics computing entity 106 may determine a consumer-based relationship property for a consumer-based provider relationship associated with a pair of providers based on a combination (e.g., a measure of summation and/or multiplication) of at least one property for any provider-consumer relationship of interest associated with at least one provider in the pair of providers. In some embodiments, step/operation 502 may be performed at least in part using parallel computing, e.g., by dividing consumer-based provider relationships into e groups, where one or more consumer-based relationship properties for each group are configured to be generated by a parallel process of e parallel processes; or by dividing provider-service combinations into f groups, where each group is configured to be processed by a parallel process of f parallel processes.

For example, the data analytics computing entity 106 may determine an isolated consumer-based relationship score for a consumer-based provider relationship associated with a pair of providers based on a summation of each consumer-provider cost determination for any provider-consumer combination that is associated with a provider in the pair. As another example, the data analytics computing entity 106 may determine an isolated consumer-based relationship score for a consumer-based provider relationship associated with a pair of providers based on a summation of each transaction cost determinations for any transaction that is associated with a provider in the pair. Thus, in one example, if the provider-consumer relationships of interest include a first provider-consumer relationship having a cost determination D1 between provider P1 and consumer C1, a second provider-consumer relationship having a cost determination D2 between the provider P2 and consumer C1, a third provider-consumer relationship having a cost determination D3 between provider P1 and consumer C2, and a fourth provider-consumer relationship having a cost determination D4 between provider P3 and consumer C2, the data analytics computing entity 106 may determine a first isolated consumer-based relationship score for a first consumer-based provider relationship for the pair of providers P1 and P2 and the consumer C1 based on a combination of the cost determinations for the provider-consumer relationship of interest and the second provider-consumer relationship, e.g., based on D1+D2. Moreover, the data analytics computing entity 106 may determine a second isolated consumer-based relationship score for a second consumer-based provider relationship for the pair of providers P1 and P3 and the consumer C2 based on a combination of the cost determinations for the third provider-consumer relationship and the fourth provider-consumer relationship, e.g., based on D3+D4.

At step/operation 503, the data analytics computing entity 106 selects consumer of interest-based provider relationships from the consumer-based provider relationships generated in step/operation 501. In some embodiments, the data analytics computing entity 106 selects the consumer of interest-based provider relationships from the consumer-based provider relationships by filtering the consumer-based provider relationships based on at least one of the one or more consumer-based relationship properties associated with the consumer-based provider relationships. For example, the data analytics computing entity 106 may filter out consumer-based provider relationships whose corresponding consumer-based isolated relationship score fails to exceed a consumer-based relationship score threshold. As another example, the data analytics computing entity 106 may filter consumer-based provider relationships whose corresponding consumer-based cost determinations fails to exceed a consumer-based cost threshold.

In some embodiments, by applying filters on the consumer-based provider relationships (e.g., filters based on one or more isolated consumer-based relationship scores and/or consumer-based cost determinations), the data analytics computing entity 106 may exclude from further analysis those consumer-based provider relationships deemed to contain insufficiently low predictive and/or insufficiently low pattern-inducement value. In doing so, the data analytics computing entity 106 may reduce the computational cost of future transactional data processing tasks related to anomaly detection in multi-provider transactional environments, e.g., transactional data processing tasks for generating graph interface views and/or transactional data processing tasks for generating network risk scores. In some embodiments, step/operation 503 may be performed at least in part using parallel computing, e.g., by dividing the consumer-based provider relationships into v groups, where each group is configured to be processed by a parallel process of v parallel processes; or by dividing the filters into w groups, where each group is each configured to be executed by a parallel process of w parallel processes.

At step/operation 504, the data analytics computing entity 106 determines aggregate provider relationships reflected within the relationship data based on the shared consumer-based provider relationships selected in step/operation 503. In some embodiments, the data analytics computing entity 106 determines an aggregate provider relationship for each pair of providers based on each shared consumer-based provider relationship associated with both providers in the pair. In some embodiments, the relationship between providers may be that of the referring provider on a claim for another provider, where the consumer sharing relationship is represented by the colocation on the same transactional record. It should be understood that other relationships such as a relationship created based upon an alternate entity such as a shared address, a shared business owner, shared phone number, or any other property of two entities in the system. In some embodiments, step/operation 504 may be performed at least in part using parallel computing, e.g., by dividing the shared consumer-based provider relationships into y groups, where each group is configured to be processed by a parallel process of y parallel processes; or by dividing the possible pairs of providers into z groups, where consumer-based provider relationships for each group is configured to be determined by a parallel process of z parallel processes. In some embodiments, by generating relationships based on pairs of providers at a shared-consumer level, the data analytics computing entity 106 can process the transaction data at a higher level of sophistication from the consumer-based level, thus enabling additional application of additional filters to reduce computational cost of transactional data processing.

For example, if the shared consumer-based provider relationships include a shared consumer-based provider relationship between providers P1 and P2 and the consumer C1, a second consumer-based provider relationship between consumers P1 and P2 and the consumer C2, a third consumer-based provider relationship between consumers P3 and P4 and the consumer C1, and a fourth consumer-based provider relationship between consumers P3 and P4 and the consumer C2, the anomaly handling computing entity 106 may generate a first aggregate provider relationship between providers P1 and P2 which corresponds to the shared consumer-based provider relationship and the second consumer-based provider relationship. Moreover, the anomaly handling computing entity 106 may generate a second aggregate provider relationship between providers P3 and P4 which corresponds to the third consumer-based provider relationship and the fourth consumer-based provider relationship.

At step/operation 505, the data analytics computing entity 106 determines one or more aggregate relationship properties for each aggregate provider relationship determined in step/operation 504. In some embodiments, the data analytics computing entity 106 determines at least one aggregate relationship property for each aggregate provider relationship based on each member-based relationship property for a member-based provider relationship associated with the aggregate provider relationship. In some embodiments, the data analytics computing entity 106 determines an aggregate cost determination for each aggregate provider relationship and/or an aggregate consumer quantity determination for each aggregate provider relationship. In some embodiments, the data analytics computing entity 106 determines an aggregate isolated relationship score for each aggregate provider relationship based on at least one of the aggregate cost determination for the aggregate provider relationship and the aggregate consumer quantity for the aggregate provider relationship. In some embodiments, step/operation 505 may be performed at least in part using parallel computing, e.g., by dividing the consumer-based provider relationships into q groups, where each parallel process of q parallel processes is configured to process the shared consumer-based provider relationships in a corresponding group of the q groups; or by dividing the aggregate relationship properties into s groups, where each parallel process of s parallel processes is configured to generate aggregate relationship properties in a corresponding group by processing the shared consumer-based provider relationships.

In some embodiments, the data analytics computing entity 106 determines an aggregate cost determination for an aggregate provider relationship based on each consumer-based cost determination for a shared consumer-based provider relationship associated with the aggregate provider relationship. For example, if the shared consumer-based provider relationships include a shared consumer-based provider relationship having a shared consumer-based cost determination D1 between providers P1 and P2 and the consumer C1, a second consumer-based provider relationship having a second consumer-based cost determination D2 between consumers P1 and P2 and the consumer C2, a third consumer-based provider relationship having a third consumer-based cost determination D3 between consumers P3 and P4 and the consumer C1, and a fourth consumer-based provider relationship having a fourth consumer-based cost determination D4 between consumers P3 and P4 and the consumer C2, the anomaly handling computing entity 106 may determine a first aggregate cost determination for a first aggregate provider relationship between providers P1 and P2 based on a combination on the shared consumer-based cost determination and the second consumer-based cost determination, e.g., based on D1+D2. Moreover, the anomaly handling computing entity 106 may determine a second aggregate cost determination for a first aggregate provider relationship between providers P3 and P4 based on a combination on the third consumer-based cost determination and the fourth consumer-based cost determination, e.g., based on D3+D4.

In some embodiments, the data analytics computing entity 106 determines an aggregate consumer quantity determination for an aggregate provider relationship based on a count of each shared consumer-based provider relationship associated with the aggregate provider relationship. For example, if the shared consumer-based provider relationships include a first shared consumer-based provider relationship between providers P1 and P2 and the consumer C1, a second consumer-based provider relationship between consumers P1 and P2 and the consumer C2, a third consumer-based provider relationship between consumers P3 and P4 and the consumer C1, and a fourth consumer-based provider relationship between consumers P3 and P4 and the consumer C2, the data analytics computing entity 106 may determine a first aggregate consumer quantity determination for a first aggregate provider relationship between providers P1 and P2 based on a count of the first shared consumer-based provider relationship and the second consumer-based provider relationship, i.e., based on the value of 2. Moreover, the data analytics computing entity 106 may determine a second aggregate consumer quantity determination for a second aggregate provider relationship between providers P3 and P4 based on a count of the third consumer-based provider relationship and the fourth consumer-based provider relationship, i.e., based on the value of 2.

At step/operation 506, the data analytics computing entity 106 selects filtered aggregate provider relationships from the aggregate provider relationships determined in step/operation 504 and reflected in the relationship data. The data analytics computing entity 106 may thus apply filters based on those summarized characteristics of relationships between providers (providing functionality similar to providing filters of summary "edges" (indicative of relationships between providers) between "nodes" (reflecting characteristics of individual providers) as could be provided within a graphical database storage structure. In some embodiments, the data analytics computing entity 106 selects the filtered aggregate provider relationships from the aggregate provider relationships by filtering to attain a desired level of connectivity or volume of resulting relationships the aggregate provider relationships based on at least one of the one or more aggregate relationship properties associated with the aggregate provider relationships. For example, the data analytics computing entity 106 may filter out aggregate provider relationships whose corresponding isolated aggregate relationship scores fail to exceed an aggregate relationship score threshold. As another example, the data analytics computing entity 106 may filter aggregate provider relationships whose corresponding aggregate cost determinations fail to exceed an aggregate cost threshold. As yet another example, the data analytics computing entity 106 may filter aggregate provider relationships whose corresponding aggregate consumer quantity determinations fail to exceed an aggregate quantity threshold.

In some embodiments, by applying filters on the aggregate provider relationships (e.g., one or more filters based on one or more isolated aggregate relationship scores, one or more aggregate cost determinations, and/or aggregate consumer quantity determinations), the data analytics computing entity 106 may exclude from further analysis those aggregate provider relationships deemed to contain insufficiently low predictive and/or insufficiently low pattern-inducement value. In doing so, the data analytics computing entity 106 may reduce the computational cost of future transactional data processing tasks related to anomaly detection in multi-provider transactional environments, e.g., transactional data processing tasks for generating graph interface views and/or transactional data processing tasks for generating network risk scores. In some embodiments, step/operation 506 may be performed at least in part using parallel computing, e.g., by dividing the aggregate provider relationships into t groups, where one or more aggregate relationships in each group of the aggregate provider relationships is configured to be processed by a parallel process of t parallel processes; or by dividing the filters into u groups, where each group of filters is each configured to be executed on the aggregate provider relationships by a parallel process of u parallel processes.

B. Generating Graph Interface Views

The data visualization engine 116 of the data analysis computing entity 106 may be configured to generate graph interface views based on the preprocessed transactional data (reflected within the relationship data). In some embodiments, to generate graph interface views based on transactional data embodied within provider data and relationship data, the data visualization engine 116 performs transformations to create transmutations of the relationship data. These graph interface views may be provider-specific ego nets (the provider being identified based at least in part on provider-specific data, such as a unique identifier associated with the provider; a provider name; a provider address; and/or the like), such that a single graph interface view corresponds to a single provider, having that provider as the visually-central anchoring point of the graph interface view. In order to establish these provider-specific graph interface views, the data analysis computing entity 106 generates provider-specific transmutations of the relationship data, which encompasses only that portion of the relationship data relevant to the graph interface view to be provided for the particular provider. The relationship data identified as relevant for a particular transmutation may be placed into a new table (which may be referred to as a master or target providers table—relevant to the particular (also referred to herein as a "master provider" or "target provider") of the transmutation). Rather than generating a largely cluttered and difficult-to-comprehend data output for a user, the target providers table may focus later analysis on the most relevant relationships between providers identified within the target providers table. Moreover, this table may be individually usable for generating a later graphical interface, as the table may be generated to include both provider-specific data (e.g., node data) and relationship-specific data (e.g., edge data).

One objective of various embodiments of the present invention related to generating graph interface views is to generate relationship data transmutations based on features that, when depicted using a graph user interface, provide meaningful visual guides to users for detecting anomalous activities in multi-provider environments characterized by the relationship data. Another objective of the various embodiments of the present invention related to generating graph interface views is to generate relationship data transmutations based on features that provide meaningful factors for generating risk metrics associated with at least portions of multi-provider networks. A yet third objective of various embodiments of the present invention related to generating graph interface views is to generate relationship data transmutations using operations that are conducive to parallel programming, thus decreasing computational cost of generating transmutations of relationship data.

FIG. 6 depicts a flowchart diagram of an example process 600 for generating a graph interface view for a multi-provider network. Various steps/operations of process 600 may be performed by a system of one or more computers, e.g., the data analytics system 101 of FIG. 1. Via the various steps/operations of process 600, the data analytics system 101 can generate graph interface views for multi-provider environments using provider-centric transmutations of relationship data characterizing those multi-provider environments.

Process 600 begins at step/operation 601 by obtaining relationship data reflective of the preprocessed transactional data from 506 For example, the data analytics system 101 may maintain relationship data in the storage system 114 of the data analytics system 101. In some embodiments, relationship data include provider data items that each provide one or more provider properties associated with a provider of the multi-provider environment. In some embodiments, relationship data include data items that each provide one or more relationship properties associated with a relationship between two providers of the multi-provider environment. In some embodiments, the data analytics system 101 maintains relationship data using one or more relational databases (e.g., one or more MySQL databases) and/or one or more non-relational databases (e.g., one or more JSON databases and/or one or more NOSQL databases).

At step/operation 602, the data visualization engine 116 of the data analytics system 101 generates a direct provider-centric transmutation for each master provider of one or more master providers. In some embodiments, the data visualization engine 116 identifies a master provider. For example, the data visualization engine 116 may identify the master provider based on a user input requesting graph interface views associated with a particular provider in the multi-provider environment. In some embodiments, the data visualization engine 116 generates a direct provider-centric transmutation for each master provider, where each direct provider-centric transmutation includes a subset of the relationship data identified as satisfying a direct relational proximity criterion relative to the corresponding master provider for the provider-centric transmutation.

At step/operation 603, the data analytics computing entity 106 is configured to prune certain connections/data portions established within the provider specific transmutations based on one or more characteristics. For example, individual connections that are not deemed relevant to a particular analysis may be removed at this stage, prior to generating a visual graph for the particular provider, so as to avoid including potentially misleading or confusing information for the user. Although illustrated as occurring after generation of the provider-specific data tables (transmutations) for corresponding master providers, it should be understood that in certain embodiments, this pruning may occur prior to generation of the provider-specific transmutations. Moreover, particular connections or other portions of data within the provider specific data tables may be selected to be removed (pruned) from the transmutation based on one or more specific characteristics, which may be selected automatically or manually (e.g., based on manual user input). For example, based on aggregate values associated with particular connections, each connection between providers may be assigned a weight, and connections deemed not to satisfy a particular target weight may be automatically removed. However, it should be understood that weighting may be assigned via any of a variety of other characteristics and/or data portions selected for removal may be identified via other methodologies.

As examples, characteristics that may be utilized to establish weighting for particular connections, and ultimately to determine which connections are pruned from the provider-specific data tables may comprise one or more of: (i) a relationship score for the particular relationship determined based on the isolated aggregate relationship score for the corresponding aggregate provider relationship as possibly adjusted in accordance with a first aggregate parameter; (ii) a cost determination for the particular relationship determined based on the aggregate cost determination for the corresponding aggregate provider relationship as possibly adjusted in accordance with a second aggregate parameter; and (iii) a consumer quantity determination for the particular relationship determined based on the aggregate consumer quantity determination for the corresponding aggregate provider relationship as possibly adjusted in accordance with a third aggregate parameter.

For example, in some embodiments, the data visualization engine 116 generates a direct provider-centric transmutation for a master provider that includes a first subset of relationship data identified as satisfying a direct relational proximity criterion relative to the master provider. The first subset may include provider data associated with any direct partner providers that are in relationships with a master provider node and/or data for relationships each involving a master provider node. For example, in some embodiments, the data visualization engine 116 may determine that a direct provider-centric transmutation for a master provider includes relationship data related to the relationship between the master provider and another provider of a plurality of providers.

At step/operation 604, the data visualization engine 116 generates an indirect provider-centric transmutation for the master provider. For example, data indicative of relationships between various providers not considered to be the master provider for a particular transmutation may still be deemed relevant for display within an ego net of a graphical user interface focused on a particular master provider. These relationships, such as relationships between two or more providers that are each individually related to the master provider (either directly or indirectly), may thus be reflected within the data transmutation for the individual provider by self-joining data indicative of these indirect connections (which may also be referred to as second degree connections) based at least in part on those primary connections between the involved providers and the master provider. In some embodiments, the data visualization engine 116 generates the indirect provider-centric transmutations to include a subset of the relationship data identified as satisfying an indirect relational proximity criterion relative to the corresponding master provider for the provider-centric transmutation. For example, in some embodiments, the data visualization engine 116 generates an indirect provider-centric transmutation for a master provider that includes a subset of relationship data identified as satisfying an indirect relational proximity criterion relative to the master provider. The subset may include provider data associated any indirect or direct partner nodes that are in relationships with any direct partner node (other than the master provider node and any direct partner nodes) and/or relationship data for relationships each involving both a direct partner node and an indirect partner node. In some embodiments, the data visualization engine 116 generates the indirect provider-centric transmutation by performing a self-join operation on the direct provider-centric transmutation. Each provider-centric transmutation comprises data indicative of providers who also have their own provider-centric transmutations (reflected data tables generated based on those providers being identified as master providers). By utilizing the first transmutations of these providers, additional information may be utilized to link providers indirectly. When the relationship data regarding the connections are added, a second-degree relationship may be displayed. For example, a provider that treats the same consumers that have seen a second provider, where that second provider has additional consumer relationships, and those consumers have a relationship with a third provider that is unknown to the set of consumers that have a relationship with the first and second providers.

At step/operation 605, the data visualization engine 116 generates other transmutations of data that will be used to generate the graph. For example, the data visualization engine 116 may determine a provider-centric transmutation of data for the master provider that includes any missing relationships between two direct provider nodes. As another example, the data visualization engine 116 may determine a provider-centric transmutation of data for the master provider that includes a third subset of provider centric transmutations identifying as satisfying an independent proximity criterion relative to the master provider. The third subset may include relationship data (e.g., provider data and/or relationship data) for relationships each involving two indirect partner nodes.

In some embodiments, an operational example of aspects of the operations performed in steps/operations 602-605 are depicted in FIG. 7, which provides an operational example of generating provider-centric transmutations of relationship data. In the operational example of FIG. 7, relationship data 701 is represented by ten pairs of letters, where each pair represents that the relationship data 701 for a relationship involving providers corresponding to both letters of the pair provider data for each provider corresponding to a letter of the pair as well as relationship data for a relationship involving providers corresponding to both letters. As just one of the illustrated examples, the pair AB indicates that relationship data 701 includes provider data for provider A, provider data for provider B, and relational data for a relationship involving provider A and provider B.

The operational example of FIG. 7 further depicts that the data visualization engine 116 has generated three provider-centric transmutations of the relationship data 701 for the master provider A (i.e., transmutation 702A, transmutation 702B, and transmutation 702C) as well as three provider-centric transmutations of the relationship data 701 for the master provider B (i.e., transmutation 703A, transmutation 703B, and transmutation 703C). In some embodiments, to generate the six depicted transmutations, the data visualization engine 116 may group the provider-centric transmutations into x groups, where each group of provider-centric transmutations is configured to be generated by a parallel process of x parallel processes. For example, the data visualization engine 116 may generate each single provider-centric transmutation of the six depicted provider-centric transmutations using a parallel process of six parallel processes. As another example, the data visualization engine 116 may generate each three provider-centric transmutations associated with a particular master provider of the two master providers using a parallel process of two parallel processes. In other words, the data visualization engine 116 may generate the three provider-centric transmutations associated with provider A (i.e., transmutation 702A, transmutation 702B, and transmutation 702C) using a first parallel process and the three provider-centric transmutations associated with provider B (i.e., transmutation 703A, transmutation 703B, and transmutation 703C) using a second parallel process.

In the operational example of FIG. 7, the three provider-centric transmutations of the relationship data 701 for the master provider A include provider-centric transmutation 702A, provider-centric transmutation 702B, and provider-centric transmutation 702C). Provider-centric transmutation 702A satisfies a direct proximity criterion and includes provider data associated with direct partner providers for the provider A as well as relationship data for relationships that include the provider A. Provider-centric transmutation 702B satisfies an indirect proximity criterion and includes provider data associated with indirect partner providers for the provider A as well as relationship data for relationships that do not include provider A and include one, and only one, direct partner provider for provider A. Provider-centric transmutation 702C satisfies an independent proximity criterion and includes provider data associated relationship data for relationships that each include two indirect partner providers for the provider A.

Further, in the operational example of FIG. 7, the three provider-centric transmutations of the relationship data 701 for the master provider B include provider-centric transmutation 703A, provider-centric transmutation 703B, and provider-centric transmutation 703C). Provider-centric transmutation 703A satisfies a direct proximity criterion and includes provider data associated with direct partner providers for the provider B as well as data for relationships that include the provider B. Provider-centric transmutation 703B satisfies an indirect proximity criterion and includes provider data associated with indirect partner providers for the provider B as well as data for relationships that do not include provider B and include one, and only one, direct partner provider for provider B. Provider-centric transmutation 703C satisfies an independent proximity criterion and includes provider data associated relationship data for relationships that each include two indirect partner providers for the provider B.

Returning to FIG. 6, at step/operation 606, the data visualization engine 116 applies risk scores to the first transmutations of relationship data generated in steps/operations 602-605. In some embodiments, the data visualization engine 116 obtains risk scores for providers associated with the direct provider-centric transmutation of data generated in step/operation 602, the indirect provider centric transmutation of data generated in step/operation 604, and any other transmutations of relationship data generated in step/operation 605. The risk scores for a provider may relate to one or more past activities of the provider. The data visualization engine 116 may then apply the risk score for each provider to the provider data and/or relationship data for the provider in the first transmutations. In some embodiments, the data visualization engine 116 applies a consumer risk score for each scored consumer to provider data and/or relationship data for the scored consumer in the first transmutations when the provider of interest is determined to have a particular relationship (e.g., a visitation relationship and/or a frequent visitation relationship) with the provider of interest. The risk scores for a consumer may relate to one or more past activities of the consumer. This application involves the summing, averaging, or applying some other function to the scores of the consumers at a provider, to represent whether the consumers at this provider have a score of relative high or low value compared to that at another provider.

At step/operation 607, the data visualization engine 116 generates a network risk score for a network of relationships including each relationship from the first transmutations of relationship data generated in steps/operations 602-605. For example, the data visualization engine 116 may determine the network risk score for a network (e.g., a combination) of multiple relationships based on one or more properties of each relationship among the multiple relationships, such as a risks score of at least one provider associated with the relationship (e.g., a risk score of the non-master provider in a direct relationships or a risk of both providers in an indirect relationships), a proximity degree of each relationship, etc.

In some embodiments, various embodiments of the present invention utilize the step/operation 607 to determine network-specific risk scores from isolated (e.g., non-network-specific) risk scores. This may identify discrepancies between the risk associated with a provider when considering only the data associated with the actions of this one provider, versus the additional information conveyed by the knowledge that the provider treats the same consumers, shares the same claims, addresses or some other property with another provider who is a known or suspected bad actor. In some embodiments, generating network-risk scores causes detection of anomalous activities by virtue of associations between providers even when a provider, in isolation, does not appear to present risk. In some embodiments, by utilizing network-specific network-risk scores, the data visualization engine 116 and/or the anomaly activity detection unit 117 can detect anomalous activates resulting from associational and/or relational patterns between providers in a multi-provider environment.

At step/operation 608, the data visualization engine 116 generates interface properties for providers and/or relationships associated with the first transmutations of relationship data generated in steps/operations 602-605. An interface property for a provider and/or relationship may be a property of the provider and/or relationship that will be presented using modifications to user interface elements associated with the graph interface. For example, the interface properties for a provider may include a location of the provider in a graph interface that has a geographic background user interface element (e.g., a map user interface element), wherein the location of the provider may be determined based on a real-world address of a place associated with the provider. As another example, the interface properties for a provider may include color and/or shape designations in the graph interface to indicate one or more properties associated with the provider, such as the existence of an active fraud investigation related to the provider.

In some embodiments, generating a node of a graph interface view (e.g., a central node, a medial node, and/or a peripheral node) involves determining one or more of a shape for the node, a color for the node, a location for the node, and/or one or more information data items associated with the node. In some embodiments, the shape of a node and/or the color of a node may be determined based on a type of a provider associated with the node. For example, in a graph interface view associated with a multi-provider environment for delivery of medical services, the shape and/or color of a node may indicate whether the corresponding provider is a hospital, a solo-practitioner, a lab, etc. As another example, in a graph interface view associated with a multi-provider environment for delivery of medical services, the shape and/or color of a node may indicate an expertise of the corresponding provider. In some embodiments, a location for a node in a graph interface view may be determined based on locations of one or more nodes each corresponding to a provider that is involved in relationships with the node, where the one or more nodes may have already been assigned a location within the graph interface view by the data visualization engine 116. In some embodiments, a location for a node in a graph interface view may be determined based at least in part on a geographic location of an established place for the provider associated with the node, for example a geographic location of the established place for the provider on a map. In some embodiments, the one or more informational data items associated and the node may be determined based on one or more provider properties for a provider associated with the node.

In some embodiments, generating an edge of a graph interface view involves determining one or more of a shape for the node, a color for the node, and/or one or more information data items associated with the node. In some embodiments, the shape and/or color of an edge may indicate a type of the relationship associated with the edge. For example, in a graph interface view associated with a multi-provider environment for delivery of medical services, the shape and/or color of an edge may indicate that a corresponding relationship is a referral relationship or a co-visitation relationship. In some embodiments, the one or more informational data items associated with an edge may be determined based on one or more relationship properties for a relationship associated with the edge, such as a relationship property determined based on whether the relationship satisfies a particular relational proximity criterion.

At step/operation 609, the data visualization engine 116 removes data associated with inverse relationships from the relationship data in the first transmutations of relationship data generated in steps/operations 602-605. In some embodiments, the data visualization engine 116 removes an inverse relationship from an indirect provider node to a direct provider node, or from a direct provider node to the master node. In some embodiments, the data visualization engine 116 removes data related to a relationship between a first provider and a second provider if the data visualization engine 116 determines that the relationship data includes information related to an inverse relationship between the first provider and the second provider.

At step/operation 610, the data visualization engine 116 generates a graph interface view for at least one provider-centric transmutation of the plurality of provider-centric transmutations associated with a master provider. In some embodiments, the graph interface view graphically depicts relationships between the master provider and additional providers identified within any subset of data associated with the at least one provider-centric transmutation.

For example, in some embodiments, the data visualization engine 116 identifies one or more selected provider-centric transmutations for a master provider (e.g., based on user instructions transmitted by an external computing entity 102), where the one or more selected provider-centric transmutations are configured to be used to construct the graph interface view for the master provider. The data visualization engine 116 then generates a central node in the graph interface view corresponding to the master provider. Afterward, if the one or more selected provider-centric transmutations for the master provider include a first provider-centric transmutation having a direct relational proximity, the data visualization engine 116 may generate a medial node in the graph interface view corresponding to each direct provider node identified based on the first provider-centric transmutation. Furthermore, the data visualization engine 116 may generate an edge from the central node to any particular medial node corresponding to a direct relationship involving the master node and the particular direct partner provider for the medial node. Thereafter, if the one or more selected provider-centric transmutations for the master provider include a second provider-centric transmutation having an indirect relational proximity, the data visualization engine 116 may generate a peripheral node in the graph interface view corresponding to each indirect provider node identified based on the second provider centric transmutation. Furthermore, the data visualization engine 116 may generate an edge from a medial node for a direct provider node involved in an indirect relationship identified based on the second provider-centric transmutation to the particular peripheral node corresponding to an indirect provider node involved in the indirect relationship. Next, if the one or more selected provider-centric transmutations for the master provider include a third provider-centric transmutation having an independent relational proximity, the data visualization engine 116 may generate an edge between two peripheral nodes associated with an independent relationship identified based on the third provider-centric transmutation.

FIGS. 8A-8C depict operational examples of graph interface views. The graph interface view 800 depicted in the operational example of FIG. 8A depicts a central node 801 associated with a master provider; multiple medial nodes, such as medial nodes 804, each associated with a direct partner provider for the master provider; and multiple peripheral nodes, such as peripheral node 806, each associated with an indirect partner provider for the master provider node. Moreover, the graph interface view 800 depicts two direct edges between central node 801 and medial node 804, i.e., a direct edge 802 indicating a first relationship between the master provider and a direct partner provider associated with medial node 804 and a direct edge 803 indicating a second relationship between the master provider and the direct partner provider associated with the medial node 804. Moreover, the graph interface view 800 includes an indirect edge 805 indicating a relationship between the medial node

804 and the peripheral node 806. The depiction of multiple types of relationships between the entities is permissible and is not restricted in the interface.

Furthermore, graph interface view 810 depicted in the operational example of FIG. 8B further includes an independent edge 811 between two indirect partner providers, as well as informational data for an independent relationship associated the independent edge 811 that the user can cause to be displayed by moving a cursor to a location in the graph interface view 810 associated with the independent edge 811. Moreover, graph interface view 820 depicted in the operational example of FIG. 8C depicts informational data 822 for a node 821 that a user can cause to be displayed by moving a cursor to a location in the graph interface view 820 associated with a particular node 821.

C. Generating Anomalous Activity Risk Scores

The anomalous activity detection unit 117 of the data analytics computing entity 106 is configured to generate anomalous activity risk scores for a multi-provider environment. For example, the anomalous activity detection unit 117 may be configured to generate network risk scores for each of one or more provider-centric networks of the multi-provider environment, where the network risk scores may be determined based on risk scores for relationships in a provider-centric network and/or network-specific relationship scores for relationships in a provider-centric network. One objective of the risk score generation aspects of the present invention is to enable anomalous activity detection using factors both universal and local to particular portions of the multi-provider environment, e.g., particular provider-centric networks in the multi-provider environment. Another objective of the risk generation aspects of the present invention is to enable anomalous activity detection using information that can be determined from graph interface views generated using provider-centric transmutations of relationship data for a multi-provider environment.

FIG. 9 depicts a flowchart diagram of a process 900 for generating a network risk score for a provider-centric network in a multi-provider environment. The various steps/operations of process 900 may be performed by a system of one or more computers, e.g., the data analysis system 101 of FIG. 1. Via the various steps/operations of process 900, the data analysis system 101 can generate network risk scores based on risk scores for relationships in a provider-centric network and/or network-specific relationship scores for relationships in a provider-centric network.

Process 900 begins at step/operation 901 by identifying a target provider in the multi-provider environment. For example, the anomalous activity detection unit 117 may identify a target provider based on user input transmitted by an external computing entity 102. Then, at step/operation 902, the anomalous activity detection unit 117 determines multiple relationships associated with the multi-provider environment based on relationship data associated with the multi-provider data analysis system, where each relationship is associated with a network-based relationship score.

In some embodiments, the anomalous activity detection unit 117 may determine, from relationship data in the relationship data, multiple relationships each satisfying a relational proximity criterion. For example, the anomalous activity detection unit 117 may determine a provider-centric transmutation of relationship data satisfying a direct relational proximity criterion relative to the target provider and use a provider-centric transmutation to determine one or more relationships satisfying a direct relational proximity criterion. As another example, the anomalous activity detection unit 117 may determine a provider-centric transmutation of relationship data satisfying an indirect relational proximity criterion relative to the target provider and use a provider-centric transmutation to determine one or more relationships satisfying an indirect relational proximity criterion. As yet another example, the anomalous activity detection unit 117 may determine a provider-centric transmutation of relationship data satisfying an independent relational proximity criterion relative to the target provider and use a provider-centric transmutation to determine one or more relationships satisfying an independent relational proximity criterion. In some embodiments, the anomalous activity detection unit 117 identifies at least one relationship and/or a satisfied relational proximity criterion for each identified relationship by analyzing nodes and edges displayed using a graph interface view.

In some embodiments, the anomalous activity detection unit 117 may determine the network-based relationship score for a relationship based on the relational proximity criterion satisfied by the relationship. For example, the anomalous activity detection unit 117 may adjust a raw network-based relationship score based on various adjusting values (e.g., a first, second, and third adjusting value) for a direct relationship using a first adjusting value, a raw network-based relationship score for an indirect relationship using a second adjusting value, and raw network-based relationship score for an independent relationship using a third adjusting value. In some embodiments, the first adjusting value associated with first degree edges is larger than the weighting factor for the second adjusting value corresponding to degree connections. In some embodiments, the second adjusting value is larger than the first adjusting value. In some embodiments, the ratio of the first adjusting value to the second adjusting value and/or the ratio of the second adjusting value to third adjusting value is determined based on one or more parameters determined using a training routine, for example a training routine that uses data about past operations of the data analytics system 101 as training data.

At step/operation 903, the anomalous activity detection unit 117 obtains a risk score for each relationship. In some embodiments, the anomalous activity detection unit 117 determines the risk score for a relationship based on one or more of a provider risk score associated with a first provider involved in the relationship, a provider risk score associated with a second provider involved in the relationship, and a consumer risk score for at least one consumer that has provider-consumer relationship with both the first provider involved in the relationship and the second risk score involved in the relationship.

In some embodiments, a provider risk score for a provider in a multi-provider environment may be determined based on patterns of activities of the provider and other providers in the multi-party environment. For example, in a multi-provider environment associated with medical services delivery, one or more of the following may increase the provider risk score for a provider: an excessive pattern of referral; an excessive pattern of referral to particular providers; an excessive pattern of referral to particular providers who do not otherwise get many referrals from providers; an excessive pattern of co-visitation between the provider and another provider, etc.

At step/operation 904, the anomalous activity detection unit 117 generates a network risk score for a provider-centric network that includes the multiple relationships obtained in step/operation 902. In some embodiments, the anomalous activity detection unit 117 generates the network risk score for a provider-centric network based on the network-specific relationship score for each relationship and the risk score for each relationship. In some embodiments, the anomalous activity detection unit 117 generates network risk score based on one or more parameters determined using a training routine, for example a training routine that uses data about past operations of the data analytics system 101 as training data.

At step/operation 905, the anomalous activity detection unit 117 determines a prediction about anomalous activity in the multi-provider environment based on the network risk score generated in step/operation 904. For example, the anomalous activity detection unit 117 may determine that a particular provider is likely engaging in anomalous activity upon an initial detection the network risk score for the provider exceeds a risk threshold. As another example, the anomalous activity detection unit 177 may determine that a particular provider is likely engaging in anomalous activity if the network risk score for the particular provider continues to exceed a risk threshold for a particular period of time after the initial detection. As yet another example, the anomalous activity detection unit 117 may process the network risk scores for multiple providers to determine which particular providers among the multiple providers are likely engaging in anomalous activities.

V. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The characteristic of the linkage between provider being based upon a consumer is a common embodiment of the concept of linkage, and alternate linkages may exist such as shared addresses, corporate owners, or other properties that providers can have in common. In these alternate embodiments, linkages on alternate entity types would have a similar manifestation to that of the consumer.

The invention claimed is:

1. A computer-implemented method for anomalous activity detection in a multi-provider environment, the computer-implemented method comprising:
identifying, using one or more processors, a master provider node of a plurality of provider nodes;
determining, using the one or more processors and based at least in part on transactional data associated with the multi-provider environment, multiple relationships associated with the master provider node, wherein: (i) each relationship has a relationship degree, (ii) the multiple relationships comprise one or more direct relationships associated with a relationship degree of one, one or more indirect relationships associated with a relationship degree of two, and one or more independent relationships associated with a relationship degree of three, (iii) each direct relationship is a first direct link between a direct provider node and another provider node, (iv) each indirect relationship is a second direct link between a first provider node that is associated with a particular direct relationship and another provider node, (v) each independent relationship is a third direct link between a second provider node that is associated with a particular indirect relationship and another provider node and (vi) each relationship degree value is associated with a distinct adjustment value;
for each provider node, determining, using the one or more processors, a provider risk score,
for each relationship between two provider nodes, using the one or more processors;
determining a raw network-based relationship score based at least in part on provider risk scores for the two provider nodes, and
determining an adjusted network-based relationship score based at least in part on the raw network-based relationship score for the relationship and the distinct adjustment value for the relationship degree value that is associated with the relationship;
determining a network risk score for the master provider node based at least in part on each adjusted network-based relationship score; and
performing the anomalous activity detection based at least in part on the network risk score.

2. The computer-implemented method of claim 1, wherein the transactional data comprises a provider data item for each provider of a plurality of providers and a relationship data item defining a relationship of the multiple relationships.

3. The computer-implemented method of claim 2, further comprising:
determining the transactional data.

4. The computer-implemented method of claim 3, wherein determining the transactional data comprises:
processing one or more transaction records to create plurality of provider-consumer relationships;
determining one or more providers of interest based on the plurality of provider-consumer relationships;
processing the plurality of provider-consumer relationships to generate a plurality of member-based provider relationships; and
processing the plurality of member-based provider relationships to generate a plurality of aggregate provider relationships.

5. The computer-implemented method of claim 4, wherein each provider data item is determined based on the plurality of provider-consumer relationships.

6. The computer-implemented method of claim 4, wherein each relationship data item is generated based on the plurality of aggregate provider relationships.

7. A computer-implemented method for generating a graph interface view for anomalous activity detection in a multi-provider environment, the computer-implemented method comprising:
maintaining, using one or more processors and in a relational database, transactional data for the multi-provider environment, wherein, (i) the transactional data describes multiple relationships between multiple providers, (ii) each relationship is a direct link between two providers of the plurality of providers, (iii) each provider is associated with a provider degree value that describes a smallest number of direct links that separate the provider from a master provider of the plurality of providers, and (iv) each relationship is associated with a relationship degree value that describes a larger provider degree associated with the two providers involved in the relationship;
generating, using the one or more processors and based at least in part on the multiple relationships, M provider-centric transmutations, wherein, (i) each provider-centric transmutation comprises a subset of the multiple relationships that are associated with a common relationship degree value, and (ii) M describes a number of a plurality of relationship degree values supported by the graph interface view;

generating, using the one or more processors and using the relational database, M provider-specific tables, where each provider-specific table describes the subset of the multiple relationships in a corresponding provider-centric transmutation of the M provider-centric transmutations; and generating, using the one or more processors and based at least in part on the M provider-specific tables, the graph interface view, wherein the graph interface view graphically depicts at least a subset of the multiple relationships that are associated with the M provider-centric transmutations.

8. The computer-implemented method of claim 7, wherein maintaining the transactional data item comprises:
processing one or more transaction records to create a plurality of provider-consumer relationships;
determining one or more providers of interest based on the plurality of provider-consumer relationships;
processing the plurality of provider-consumer relationships to generate a plurality of member-based provider relationships; and
processing the plurality of member-based provider relationships to generate a plurality of aggregate provider relationships.

9. The computer-implemented method of claim 8, wherein each provider data item is determined based on the plurality of provider-consumer relationships.

10. The computer-implemented method of claim 8, wherein each relationship data item is generated based on the plurality of aggregate provider relationships.

11. An apparatus for generating a graph interface for anomalous activity detection in a multi-provider environment, the apparatus comprising at least one processor and at least one memory including program code, the at least one memory and the program code configured to, with the processor, cause the apparatus to at least:
identify a master provider node of a plurality of provider nodes;
determine, based at least in part on transactional data associated with the multi-provider environment, multiple relationships associated with the master provider node, wherein: (i) each relationship has a relationship degree, (ii) the multiple relationships comprise one or more direct relationships associated with a relationship degree of one, one or more indirect relationships associated with a relationship degree of two, and one or more independent relationships associated with a relationship degree of three, (iii) each direct relationship is a first direct link between a direct provider node and another provider node, (iv) each indirect relationship is a second direct link between a first provider node that is associated with a particular direct relationship and another provider node, (v) each independent relationship is a third direct link between a second provider node that is associated with a particular indirect relationship and another provider node, and (vi) each relationship degree value is associated with a distinct adjustment value;
for each provider node, determine a provider risk score;
for each relationship between two provider nodes;
determine a mw network-based relationship score based at least in part on provider risk scores for the two provider nodes, and
determine an adjusted network-based relationship score based at least in part on the raw network-based relationship score for the relationship and the distinct adjustment value for the relationship degree value that is associated with the relationship;
determine a network risk score for the master provider node based at least in part on each adjusted network-based relationship score; and
perform the anomalous activity detection based at least in part on the network risk score.

12. The apparatus of claim 11, wherein the transactional data comprises a provider data item for each provider of a plurality of providers and a relationship data item defining a relationship of the multiple relationships.

13. The apparatus of claim 12, wherein the at least one memory and the program code configured to, with the processor, further cause the apparatus to:
determine the transactional data.

14. The apparatus of claim 13, wherein determining the transactional data comprises:
processing one or more transaction records to create a plurality of provider-consumer relationships;
determining one or more providers of interest based on the plurality of provider-consumer relationships;
processing the plurality of provider-consumer relationships to generate a plurality of member-based provider relationships; and
processing the plurality of member-based provider relationships to generate a plurality of aggregate provider relationships.

15. The apparatus of claim 14, wherein each provider data item is determined based on the plurality of provider-consumer relationships.

16. The apparatus of claim 14, wherein each relationship data item is generated based on the plurality of aggregate provider relationships.

17. A non-transitory computer-readable storage medium for generating a graph interface for anomalous activity detection in a multi-provider environment, the computer-readable storage medium storing program code instructions that, when executed, cause a computing device to:
identify a master provider node of a plurality of provider nodes;
determine, based at least in part on transactional data associated with the multi-provider environment, multiple relationships associated with the master provider node, wherein: (i) each relationship has a relationship degree, (ii) the multiple relationships comprise one more direct relationships associated with a relationship degree of one, one or more indirect relationships associated with the relationship degree of two, and one or more independent relationships associated with the relationship degree of three, (iii) each direct relationship is a first direct link between the direct provider node and another provider node, (iv) each indirect relationship is a second direct link between a first provider node that is associated with a particular direct relationship and another provider node, (v) each independent relationship is a third direct link between a second provider node that is associated with a particular indirect relationship and another provider node, and (vi) each relationship degree value is associated with a distinct adjustment value;
for each provider node, determine a provider risk score;

for each relationship between two provider nodes:
  determine a raw network-based relationship score based at least in part on provider risk scores for the two provider nodes, and
  determine an adjusted network-based relationship score based at least in part on the raw network-based relationship score for the relationship and the distinct adjustment value for the relationship degree value that is associated with the relationship,
determine a network risk score for the master provider node based at least in part on each adjusted network-based relationship score; and
perform the anomalous activity detection based at least in part on the network risk score.

18. The non-transitory computer storage medium of claim 17, wherein the transactional data comprises a provider data item for each provider of a plurality of providers and a relationship data item defining a relationship of the multiple relationships.

19. The non-transitory computer storage medium of claim 17, wherein the program code instructions when executed further cause the computing device to:
  determine the transactional data.

20. The non-transitory computer storage medium of claim 19, wherein determining the transactional data comprises:
  processing one or more transaction records to create a plurality of provider-consumer relationships;
  determining one or more providers of interest based on the plurality of provider-consumer relationships;
  processing the plurality of provider-consumer relationships to generate a plurality of member-based provider relationships; and
  processing the plurality of member-based provider relationships to generate a plurality of aggregate provider relationships.

* * * * *

UNITED STATES PATENT AND TRADEMARK OFFICE
CERTIFICATE OF CORRECTION

PATENT NO. : 11,361,082 B2
APPLICATION NO. : 16/286918
DATED : June 14, 2022
INVENTOR(S) : Obee et al.

Page 1 of 1

It is certified that error appears in the above-identified patent and that said Letters Patent is hereby corrected as shown below:

In the Claims

Column 42
Line 1, "mw" should read --raw--

Signed and Sealed this
Second Day of August, 2022

Katherine Kelly Vidal
*Director of the United States Patent and Trademark Office*